(12) United States Patent
Wilen

(10) Patent No.: US 9,002,737 B2
(45) Date of Patent: Apr. 7, 2015

(54) GIFT CARD MALL IN THE HOME

(71) Applicant: WILopEN Products, LC, Deerfield Beach, FL (US)

(72) Inventor: Richard Wilen, Boca Raton, FL (US)

(73) Assignee: WILopEN Products LC, Deerfield Beach, FL (US)

( * ) Notice: Subject to any disclaimer, the term of this patent is extended or adjusted under 35 U.S.C. 154(b) by 0 days.

(21) Appl. No.: 13/837,250

(22) Filed: Mar. 15, 2013

(65) Prior Publication Data

US 2013/0275204 A1 Oct. 17, 2013

Related U.S. Application Data

(63) Continuation-in-part of application No. 12/464,740, filed on May 12, 2009, now Pat. No. 8,577,735.

(60) Provisional application No. 61/052,377, filed on May 12, 2008.

(51) Int. Cl.
*G06Q 30/00* (2012.01)
*G06Q 30/06* (2012.01)
(Continued)

(52) U.S. Cl.
CPC .............. *G06Q 30/0619* (2013.01); *G09F 1/10* (2013.01); *B42F 17/08* (2013.01); *B42D 15/045* (2013.01); *G06Q 30/0601* (2013.01); *B42D 5/025* (2013.01); *B42D 25/285* (2013.01);
(Continued)

(58) Field of Classification Search
CPC .......... G06Q 30/0601; G06Q 30/0619; G06Q 20/34; G06Q 20/354; G09F 1/10; B42F 17/08; B42D 15/045

USPC ............. 705/26.1, 26.44; 40/124.06; 235/380
See application file for complete search history.

(56) References Cited

U.S. PATENT DOCUMENTS 3,181,774 A 5/1965 Littman
3,356,286 A 12/1967 Greason
(Continued)

FOREIGN PATENT DOCUMENTS

WO 0070517 11/2000
WO WO 0167364 A1 * 9/2001

OTHER PUBLICATIONS

Broida, Rick: "Four last-minute gifts you can print!," The Cheapskate—CNET News, Dec. 22, 2008, <<http://news.cnet.com/8301-13845 3-10127891-58/four-last-minute-gifts-you-can-print/>>, last visted on Jul. 8, 2013.

*Primary Examiner* — Amee A Shah
(74) *Attorney, Agent, or Firm* — Johnson & Martin, P.A.; James David Johnson

(57) ABSTRACT

Systems and methods for distributing and activating gift cards and advertising so as to provide a gift card mall in the home of a gift giver are described. The system can include a unitary single-sheet form, a package envelope, an activation system, a delivery system, and a redemption system. The system can also include a publication. A plurality of the forms can be inserted into the package envelope for delivery to the gift giver. The gift giver can select one or more of the gift cards for activation and delivery to a gift recipient. The gift recipient can then redeem the activated gift received from the gift giver for a redemption item sold or provided by a retailer, service provider, or manufacturer. The redemption item can be a good, service, or money. The redemption item can be purchased at an online shopping mall, by telephone, or in a retail store.

31 Claims, 15 Drawing Sheets

(51) Int. Cl.
  *G09F 1/10* (2006.01)
  *B42F 17/08* (2006.01)
  *B42D 15/04* (2006.01)
  *B42D 5/02* (2006.01)
  *B42D 25/20* (2014.01)
  *G06Q 20/34* (2012.01)
  *G06Q 30/02* (2012.01)
  *B42D 5/00* (2006.01)

(52) U.S. Cl.
  CPC ............ *G06Q 20/34* (2013.01); *G06Q 20/354* (2013.01); *G06Q 30/0218* (2013.01); *G06Q 30/0254* (2013.01); *B42D 5/002* (2013.01); *B42D 5/027* (2013.01)

(56) References Cited

U.S. PATENT DOCUMENTS

| | | | |
|---|---|---|---|
| 3,656,684 A | 4/1972 | Meehan | |
| 3,791,572 A | 2/1974 | Gendron | |
| 4,011,985 A | 3/1977 | Simson | |
| 4,167,241 A | 9/1979 | Zumbrunn | |
| 4,860,946 A | 8/1989 | Braud | |
| 5,044,669 A | 9/1991 | Berry | |
| 5,104,036 A | 4/1992 | Rutkowski | |
| 5,288,015 A | 2/1994 | Sauerwine | |
| 5,633,071 A | 5/1997 | Murphy | |
| 5,697,547 A | 12/1997 | Kraus | |
| 6,027,014 A | 2/2000 | Cochran | |
| 6,155,476 A | 12/2000 | Fabel | |
| 6,322,106 B1 | 11/2001 | Mehta | |
| 6,409,079 B1 | 6/2002 | Hutchinson | |
| 7,097,893 B2 | 8/2006 | McCarthy | |
| 7,370,076 B2 | 5/2008 | Friedman | |
| 2002/0011512 A1 | 1/2002 | Mehta | |
| 2002/0046089 A1* | 4/2002 | Zorn | 705/14 |
| 2003/0040964 A1 | 2/2003 | Lacek | |
| 2003/0048888 A1* | 3/2003 | Hopper et al. | 379/114.2 |
| 2003/0150142 A1 | 8/2003 | Street | |
| 2004/0015404 A1 | 1/2004 | McCarthy | |
| 2004/0046035 A1 | 3/2004 | Davila | |
| 2004/0098449 A1 | 5/2004 | Bar-Lavi | |
| 2005/0116015 A1 | 6/2005 | Yost | |
| 2005/0229450 A1 | 10/2005 | Larsen | |
| 2005/0284927 A1 | 12/2005 | Wilen | |
| 2006/0065748 A1 | 3/2006 | Halbur | |
| 2006/0200362 A1* | 9/2006 | Paciolla et al. | 705/1 |
| 2006/0243792 A1* | 11/2006 | Morello et al. | 235/380 |
| 2006/0266665 A1 | 11/2006 | Clarke | |
| 2006/0273153 A1 | 12/2006 | Ashby | |
| 2006/0293963 A1 | 12/2006 | Hoblit | |
| 2007/0017973 A1* | 1/2007 | Blank et al. | 235/380 |
| 2007/0051797 A1 | 3/2007 | Randolph-Wall | |
| 2007/0063020 A1* | 3/2007 | Barrafato | 235/380 |
| 2007/0187487 A1 | 8/2007 | Wilen | |
| 2007/0201772 A1 | 8/2007 | Schindele | |
| 2007/0235932 A1 | 10/2007 | Singer | |
| 2007/0243936 A1 | 10/2007 | Binenstock | |
| 2007/0265919 A1 | 11/2007 | Jarjour | |
| 2007/0267313 A1 | 11/2007 | McLean | |
| 2008/0048041 A1 | 2/2008 | Riley | |
| 2008/0149516 A1 | 6/2008 | Bruzzese | |
| 2008/0254419 A1 | 10/2008 | Cohen | |
| 2008/0258374 A1* | 10/2008 | Inoue | 271/9.03 |
| 2008/0281704 A1 | 11/2008 | Shuhy | |
| 2009/0037270 A1 | 2/2009 | Patro | |
| 2010/0006638 A1 | 1/2010 | Bakic | |
| 2011/0101667 A1 | 5/2011 | Alizieri et al. | |
| 2011/0125607 A1 | 5/2011 | Wilen | |
| 2011/0161190 A1 | 6/2011 | Lotvin | |

* cited by examiner

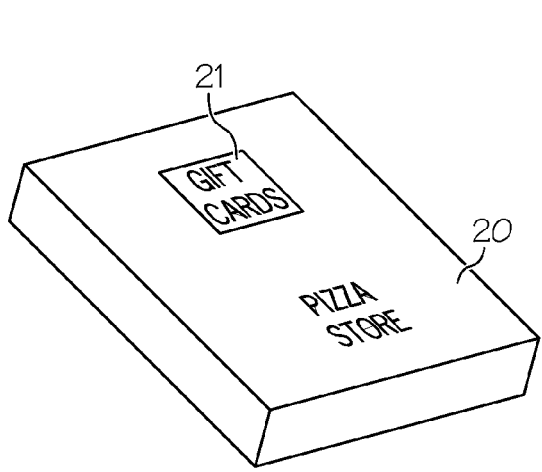
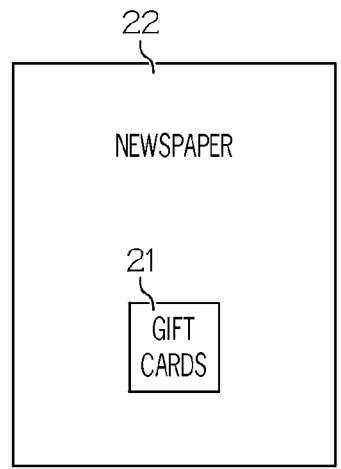
FIG. 3A    FIG. 3B
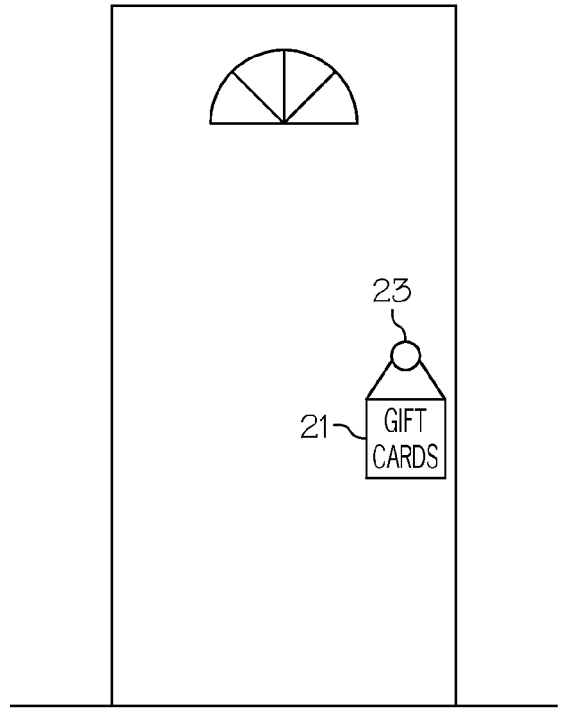
FIG. 3C

GIFT CARD MALL IN THE HOME

CROSS-REFERENCE TO RELATED APPLICATION

This application is a continuation-in-part application of and claims priority from U.S. nonprovisional patent application Ser. No. 12/464,740 filed May 12, 2009, which is a nonprovisional of U.S. provisional patent application Ser. No. 61/052,377 filed May 12, 2008. The foregoing application is incorporated in its entirety herein by this reference.

FIELD OF THE INVENTION

The invention relates to gift card and advertising distribution. More particularly, the invention relates to systems and methods for distributing a plurality of non-activated gift cards, along with advertising, directly to a home of a potential gift giver for activation and delivery by and from the gift giver to a gift recipient.

BACKGROUND

Significant changes have taken place in the payment systems of American businesses. The growth of electronic pre-paid products, stored value cards, debit cards, and gift cards, both open and closed loop, have resulted in changing payment habits and business opportunities, new technologies, and new methods of distribution.

The market for pre-paid products, stored value cards, debit cards, and gift cards continues to grow. Traditionally, magnetic stripe plastic financial transaction cards have been sold individually at retail to be activated at the time of purchase, at the point of purchase. The purchaser at the point of purchase places a monetary amount on the card through register activation. That is, the buyer adds value to a previously valueless piece of plastic, and transforms the card into a monetary instrument. By adding a cash value to these zero balance cards, the cardholder can purchase services or merchandise at a cost up to the gift cards value on either a closed or open looped basis.

In many cases, the prepaid card buyer will insert the activated gift card into a greeting card, and then into an envelope, in order to create a gift or present that can be handed to or mailed to the intended recipient. The use of prepaid or stored value cards as gift items has sky rocketed over a comparatively short amount of time, affecting the sale and use of greeting cards specifically, and retailing, in general. The convenience and assured satisfaction of the recipient have factored greatly in the rise of gift cards.

The retailer benefits from this transaction because the consumer pays in advance of purchase to the seller of the gift card. No interest or guarantee of repayment is given, and the monetary value of the card can only be retrieved when the person in possession of the card makes a purchase from a specific retail brand in a closed loop situation, or almost any retailer in an open loop situation. Post-transaction, once the designated monetary value is reached, some open-loop cards may then be reloaded with additional funds.

In financial reality, consumers are, in essence, loaning large amounts of money, at no interest, to the issuing companies. Some of that advance payment may be lost to the cardholder since no change is given when the cardholders purchase amount is less than the amount designated on the card. Leftover monies are not generally of a large enough denomination to be used for additional purchases, and in many cases, are never retrieved. Generally speaking, there are no records being kept in relation to the amount bought, or by whom, or where nor the amount being spent, or by whom. Neither is there a report given to the possessor of the card about any balances that may be left. Recent changes in the law have altered card issuers' ability to access and use funds with which gift cards and other financial card products are funded. The funds are available to a card issuer for a period of 3-5 years, after which the funds escheat to the state government where the card was issued.

Most issuers have recently stopped charging service fees and are now required to include an expiration date on issued cards. Most card issuers are seeking additional ways to enhance the structure and delivery of gift cards because consumers continue to place more emphasis on prepaid shopping and more dollars on gift cards each year. While there are a variety of reasons for the rise in stored value and prepaid gift card the overwhelming reason for consumers is convenience.

SUMMARY

The invention relates to systems and methods for distributing and activating gift cards and advertising so as to provide a gift card mall in the home of a gift giver. The system can include a unitary single-sheet form, a package envelope, an activation system, a delivery system, and a redemption system. A plurality of the forms can be inserted into the package envelope for delivery to the gift giver. The gift giver can select one or more of the gift cards for activation and delivery to a gift recipient. Both the gift giver and the gift recipient are consumers. The gift recipient can then redeem the activated gift received from the gift giver for a redemption item sold or provided by a retailer, service provider, or manufacturer. The redemption item can be a good, service, or money. The redemption item can be purchased at an online shopping mall, by telephone, or in a retail store. The forms constitute a new form of media that permit retailers, manufacturers, advertisers, and system operators to distribute not only gift cards but other printed media as well, e.g., advertising, informational materials, instructions, and entertainment-related materials such as commercial games associated with advertising-supported rewards point systems that may be used by a consumer to earn and redeem points for goods, services, or money.

Methods for distributing and activating gift cards are also described herein. One method can include the steps of attaching a non-activated gift card to an article, selling the article, and activating the gift card from a remote location. The step of selling can include (1) allowing a consumer to buy the article at a retail store, (2) allowing a consumer to buy the article over a telephone line, and delivering the article to a home of a consumer or (3) allowing a consumer to buy the article over an internet connection, and delivering the article to a home of a consumer. That is, the article can be sold to a consumer at a specific point of purchase, the specific point of purchase being either a retail store or virtual store. In another method, a plurality of gift cards can be distributed to one or more known gift givers who intend to give a gift to a gift recipient or to a plurality of potential gift givers for distribution to a plurality of gift recipients known to the plurality of potential gift givers by each potential gift giver who elects to send a gift using the systems and methods described herein.

The step of activating the gift card can be completed by a gift giver in a store, online, or by telephone. Once the gift giver has activated the gift card, which includes funding the card, the gift giver may deliver the gift card to a gift recipient by mail, courier service, hand delivery, online transmission, or other delivery means. When the gift recipient receives the activated gift card, the gift recipient can redeem the gift card for goods, services, or money either online, in a brick-and-mortar retail store, or by telephone.

The step of activating the gift card can be performed by the consumer and performed at a location remote from the store. During activation, the consumer can allocate selected merchandise, a selected service, or a dollar value to the gift card, thereby providing the gift giver with a convenient way to buy and send a gift to a gift recipient.

Additionally, these gifts cards may be distributed individually or with greeting cards and envelopes. The greeting card and envelope may be personalized as an occasion card or the personalized nature of the greeting card and envelope may act as a third party endorsement for the specific brand name.

Additionally, during activation a consumer may select and write a unique code for security identification for the activation. These gift cards may be redeemed at a retail store in person, by telephone, or online.

Other methods of distributions may include mailing the non-activated gift card to a home of the consumer and/or inserting the non-activated gift card into newspapers, catalogs and other such print marketing.

Using the systems and methods described herein provides an advantage to gift givers in that a plurality of gift cards from one or more retailers, service providers, or card issuers, is delivered direct to the home (for example, as a gift card mall in the home) of a gift giver so that the gift giver may avoid traveling to a retail location or kiosk that sells or distributes gift cards to obtain a gift card as well as standing in line to purchase or activate the gift card selected. The systems described herein also provide a single point of purchase for the gift giver to activate and fund a selected gift card.

The systems and methods also provide an advantage in that, by using these systems and methods, consumers can avoid having to return a gift by sending a gift card for a product or service to a gift recipient that the gift recipient can either redeem or select a different gift or re-gift Accordingly, the invention features a system for distributing gift cards and advertising. The system can include a unitary single-sheet form, a package envelope, an activation system, a delivery system, and a redemption system. The unitary single-sheet form can feature a plurality of separable pieces that can include a plurality of non-activated gift cards and an optional correspondence piece. One or more pieces of the form can feature printed information, which can be advertising. The system further includes a gift envelope into which one or more of the plurality of gift cards, once activated, may be inserted for delivery. The gift envelope optionally can be one of the plurality of separable pieces of the form. One or more of the forms are insertable into and sealable within the package envelope to create a publication package for delivery to a gift giver. The activation system is used to activate at least one of the plurality of non-activated gift cards so as to create at least one activated gift card. The at least one activated gift card, and optionally the optional correspondence piece, are insertable into and sealable within the gift envelope to create a gift card package. The delivery system is used to deliver the gift card package from the gift giver to a gift recipient. The redemption system can be used by the gift recipient to redeem the at least one activated gift card enclosed in the gift card package for a redemption item.

In another aspect, the invention can feature the redemption item being a product, a service, or money.

In another aspect, the invention can feature the delivery system being a postal system, courier service, retail distribution, or hand delivery.

In another aspect, the invention can feature the system further including an online gift card mall accessible via a computer connected to a telecommunications system, wherein the activation system and the redemption system are accessible via the online gift card mall so that activation of the at least one activated gift card and redemption of the at least one activated gift card for the redemption item are performable online via the online gift card mall.

The invention also features a gift card and advertising form. The form can feature a unitary single-sheet form, which can include a plurality of separable pieces. The plurality of separable pieces can feature a plurality of non-activated gift cards, a gift envelope, and an optional correspondence piece. One or more pieces of the form can feature printed information, which can be advertising.

In another aspect, the invention can feature the plurality of separable pieces being removably connected to one another as components of the unitary single-sheet form at cuttable lines of separation, tearable lines of separation, perforations, or a combination of any of the foregoing.

In another aspect, the invention can feature each of the plurality of non-activated gift cards being specific to a different retailer, selling goods or services for which one of the plurality of non-activated gift cards is redeemable.

In another aspect, the invention can feature each of the plurality of non-activated gift cards being specific to a different manufacturer, providing goods or services for which one of the plurality of non-activated gift cards is redeemable.

In another aspect, the invention can feature each of the plurality of non-activated gift cards being specific to a product or service that is different from the product or service related to any other gift card in the form.

In another aspect, the invention can feature at least two of the plurality of non-activated gift cards being specific to a single retailer, selling goods or services for which one of the plurality of non-activated gift cards is redeemable.

In another aspect, the invention can feature at least two of the plurality of non-activated gift cards being specific to a single manufacturer, providing goods or services for which one of the plurality of non-activated gift cards is redeemable.

In another aspect, the invention can feature at least two of the plurality of non-activated gift cards being specific to a single product or service that is different from products or services related to any other non-activated gift cards in the form.

In another aspect, the invention can feature the form including two connected plies. The two connected plies can include a first ply forming a front side of the form and a second ply forming a rear side of the form. The gift envelope of the form can include a perforation and a slit that are present on the second ply and together create a detachable strip that covers a glue area of a lid of the gift envelope. The detachable strip can be removed by tearing the perforation when the gift envelope is detached from the form. The glue area can be uncovered once the detachable strip is removed so that the glue area is capable of being used to seal the gift envelope.

A method of the invention can be used to distribute gift cards and advertising. The method can include the steps of: (a) creating a unitary single-sheet form featuring a plurality of separable pieces, wherein the plurality of separable pieces features: a plurality of non-activated gift cards, a gift envelope, and an optional correspondence piece; wherein one or more pieces of the form includes printed information and wherein the printed information includes advertising; (b) inserting and sealing one or more of the forms into a package envelope to create a publication package; (c) delivering the publication package to a gift giver; (d) using an activation system, activating at least one of the plurality of non-activated gift cards so as to create at least one activated gift card; (e)

inserting and sealing the at least one activated gift card, and optionally the optional correspondence piece, into the gift envelope to create a gift card package; (f) delivering the gift card package to a gift recipient selected by the gift giver; and (g) providing a redemption system whereby the gift recipient can redeem the at least one activated gift card enclosed in the gift card package.

Another method of the invention can feature the activation system and the redemption system being accessible via a computer connected to a telecommunications system so that activation of the at least one activated gift card and redemption of the at least one activated gift card for a redemption item are performable online via the online gift card mall.

Another method of the invention can be used to distribute gift cards and advertising, and can include the steps of: (a) attaching a gift card form to an article that is different from the gift card form's own packaging, wherein the article features an item selected from among the following: a product sold or distributed in commerce, product packaging of a product sold or distributed in commerce, a shopping bag, a door hanger, a newspaper or other form, and a direct mail advertisement; and wherein the gift card form features at least one unitary single-sheet form featuring a plurality of separable pieces, wherein the plurality of separable pieces features: a plurality of non-activated gift cards, a gift envelope, and an optional correspondence piece; wherein one or more pieces of the form features printed information and wherein the printed information features advertising; (b) selling or distributing the article to a gift giver with the gift card form being provided simultaneously therewith so as to deliver the gift card form to the gift giver with the article that was sold or distributed to the gift giver; (c) using an activation system, activating at least one of the plurality of non-activated gift cards so as to create at least one activated gift card; (d) inserting and sealing the at least one activated gift card, and optionally the optional correspondence piece, into the gift envelope to create a gift card package; (e) delivering the gift card package to a gift recipient selected by the gift giver; and (f) providing a redemption system whereby the gift recipient can redeem the at least one activated gift card enclosed in the gift card package for a redemption item and redeeming the at least one activated gift card for the redemption item.

Another method of the invention can feature the delivery step of the method further including the step of delivering the gift card package to the gift recipient with a second gift card form to perpetuate a buying chain, wherein the buying chain is perpetuated when the gift recipient becomes a second gift giver by activating at least one of a plurality of non-activated gift cards of the second gift card form and delivers the at least one activated gift card of the second gift card form to a second gift recipient.

Another method of the invention can feature the sale or distribution step of the method further including the step of allowing the gift giver to purchase or obtain the article with the gift card form via telephone and delivering the article to a home of the gift giver.

Another method of the invention can feature the sale or distribution step of the method further including the step of allowing the gift giver to purchase or obtain the article with the gift card form via telephone and delivering the article to a home of the gift giver.

Another method of the invention can feature the sale or distribution step of the method further including the step of allowing the gift giver to buy the article with the gift card form via a telecommunications network and delivering the article to a home of the gift giver.

Another method of the invention can feature the article with the gift card form being sold to the gift recipient at a specific point of purchase.

Another method of the invention can feature the specific point of purchase being a store.

Another method of the invention can feature the store being a brick-and-mortar retail store or an online virtual store that is accessible via a telecommunications network.

Another method of the invention can feature the activation step of the method being performed by the gift giver.

Another method of the invention can feature the activation step of the method being performed at a location remote from the store.

Another method of the invention can feature the activation step of the method including the step of having the gift giver allocate a dollar value to the activated gift card by transferring funds to a gift card account associated with the specific activated gift card that is activated by the gift giver.

Another method of the invention can feature at least one of the optional correspondence piece and the envelope being personalized for a specific occasion.

Another method of the invention can feature at least one of the optional correspondence piece and the envelope being personalized for a non-specific occasion.

Another method of the invention can feature the advertising being personalized advertising selected based on data available to an advertiser creating the advertising concerning the gift giver's specific demographics and interests.

Another method of the invention can feature the redemption system being located at a brick-and-mortar retail store so that the at least one activated gift card is redeemable at the retail store.

Another method of the invention can feature the redemption system being an online retail store accessible remotely via a telecommunications network so that the at least one activated gift card is redeemable remotely via the online retail store.

Another method of the invention can feature the step of retaining any remaining non-activated gift cards of the plurality of gift cards for future activation and deliver to the same gift recipient or to a different gift recipient.

Another method of the invention can feature the redemption step of the method further including the step of allowing the gift recipient to redeem the at least one activated gift card for a redemption item at a retail store.

Another method of the invention can feature the redemption step of the method further including the step of allowing the gift recipient to redeem the at least one activated gift card for a redemption item via telephone and delivering the redemption item to a home of the recipient.

Another method of the invention can feature the redemption step of the method further including the step of allowing the gift recipient to redeem the at least one activated gift card for a redemption item via a telecommunications network and delivering the redemption item to a home of the gift recipient.

The invention also includes a method for distributing gift cards and advertising that can include the steps of: (a) attaching a gift card form to an article that is different from the gift card form's own packaging, wherein the gift card form features at least one unitary single-sheet form including a plurality of separable pieces, wherein the plurality of separable pieces includes: at least one non-activated gift card, a gift envelope, and one or more optional pieces; wherein one or more pieces of the form include printed information and wherein the printed information comprises advertising; (b) selling or distributing the article to a gift giver with the gift card form being provided simultaneously therewith so as to deliver the gift card form to the gift giver with the article that was sold or distributed to the gift giver; (c) using an activation system, activating one or more of the at least one non-activated gift cards so as to create at least one activated gift card; (d) inserting and sealing the at least one activated gift card, and optionally at least one of the one or more optional pieces, into the gift envelope to create a gift card package; (e) delivering the gift card package to a gift recipient selected by the gift giver; and (f) providing a redemption system whereby the gift recipient can redeem the at least one activated gift card enclosed in the gift card package for a redemption item and redeeming the at least one activated gift card for the redemption item.

Another method of the invention can feature the one or more optional pieces including a correspondence piece.

Another method of the invention can feature the gift card form including the gift envelope attached at a horizontal perforation to the at least one non-activated gift card and the one or more optional pieces. The gift card form can be foldable at the horizontal perforation.

Another method of the invention can feature step (b) of the method further including distributing the gift card form to the gift giver folded at the horizontal perforation around the article with the article being a receipt handed to the gift giver when the gift giver makes a purchase at a retail location.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 3A shows a first embodiment of a gift card distribution method.

FIG. 3B shows a second embodiment of the gift card distribution method.

FIG. 3C shows a third embodiment of the gift card distribution method.

DETAILED DESCRIPTION

The invention provides systems, forms, publications, and methods for distributing gift cards and advertising to customers. The customers can be consumers such as, for example, gift givers and gift recipients.

The present invention is directed towards a convenient way for consumers and sellers to sell, buy, and distribute gift cards. That is, the present invention includes, among other things, distributing either (1) a single set of a number of valueless (zero balance) gift cards or (2) a single set that contains three individual elements: a gift card, a greeting card and an envelope (hereinafter, a gift card package).

The present invention also allows any number of sets of the above (1 or 2), packaged as one individual product. All gift cards are to be sold or given away as a premium or a gift and, as with standard gift cards, the value of the card (when activated) can be in cash denomination or redeemable for specific branded merchandise or for a specific service.

The present invention is a more convenient method of distributing gift cards because it offers convenience in its delivery, pass-along potential, and all-in-one packaging.

The present invention's direct-to-consumer approach delivers a single gift card, or multitude, of gift cards direct to the home, office, or other address of a gift giver. The individual cards are then activated after they have been received in the home, e.g., by phone, Internet or an in-store visit, as needed by the gift giver. Once the cards are activated, the cards can be sent on to a gift recipient via the initial cardholders own greeting card, or one supplied by the gift card distributor.

On a commercial basis, the gift card package (i.e., stored value card, greeting card and envelope) would be available for purchase at retail in both a closed and open loop scenario. In some cases, the present invention may require a second activation once the recipient uses the activated card. This two-pronged activation, however, helps the issuer (the store) track and control the buying chain.

Like the standard method of selling prepaid gift cards, the present invention can employ as little as one valueless gift card sold and activated at retail. Or, unlike single card standard gift card sales, the present invention also has an option that offers a packet of gift cards that contains one or more valueless cards, with or without greeting cards and envelopes. These can be made available for purchase or distributed free as a single product, and activated at retail and/or at remote locations.

Although it is advisable that the size and shapes of the cards be the same as today's standard gift cards, it is not necessary. Neither is the use of magnetic stripes, chips or plastic substrates or coatings necessary.

Figure 1A:
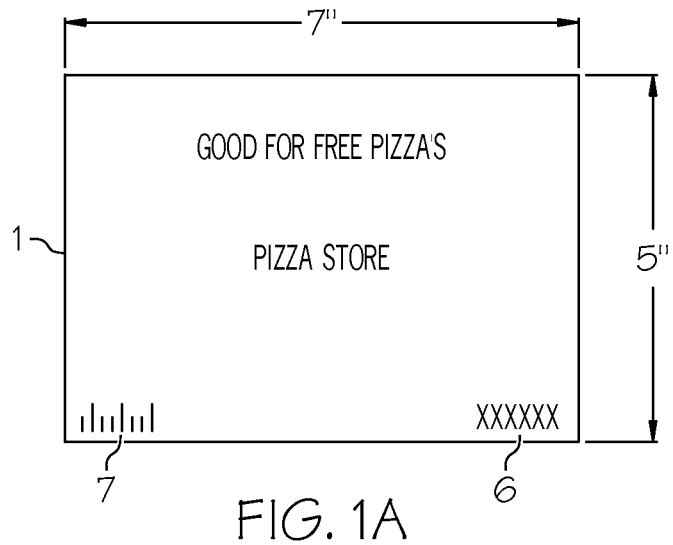
FIG. 1A is a top view of a first embodiment of a gift card.
Figure 1B:
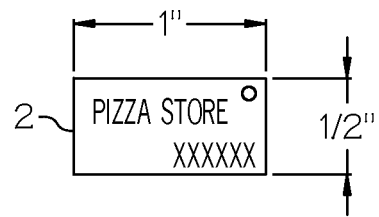
FIG. 1B is a top view of a second embodiment of the gift card.
Figure 1C:
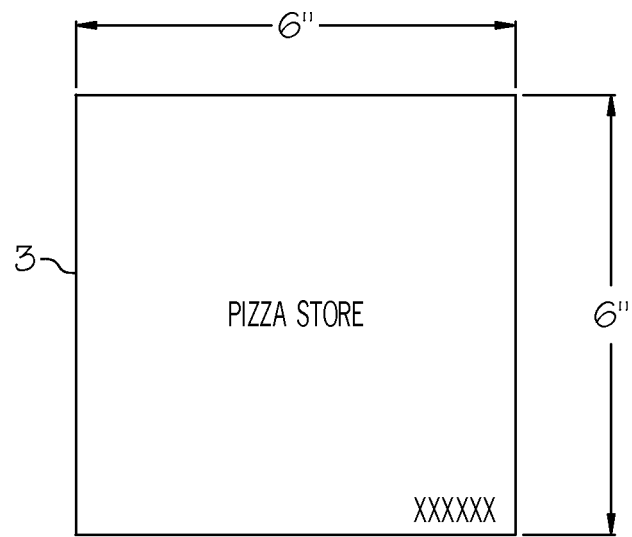
FIG. 1C is a top view of a third embodiment of the gift card.

FIGS. 1A-1C show how arbitrary numbers 6 can be applied to inch greeting card. The numbers 6 can be a gift card number associated with a gift card account. FIG. 1A shows one embodiment of a gift card of the system. For example purposes only, the gift card of this embodiment can be a standard 5"×7" card 1. FIG. 1B shows another embodiment of a gift card of the system. For example purposes only, the gift card of this embodiment can be a 1"×½" card 2 with a hole in its corner for attaching the card to a key chain. FIG. 1C shows still another embodiment of a gift card of the system. For example purposes only, the gift card of this embodiment can be a large 6"×6" card 3. Gift cards of various other sizes and shapes can be manufactured for use with the systems and methods described herein. Others cards can be manufactured and sold as gift card sets, for example, multiple gift cards placed into a single package for sale or free distribution, with or without the need of retail activation.

Figure 2:
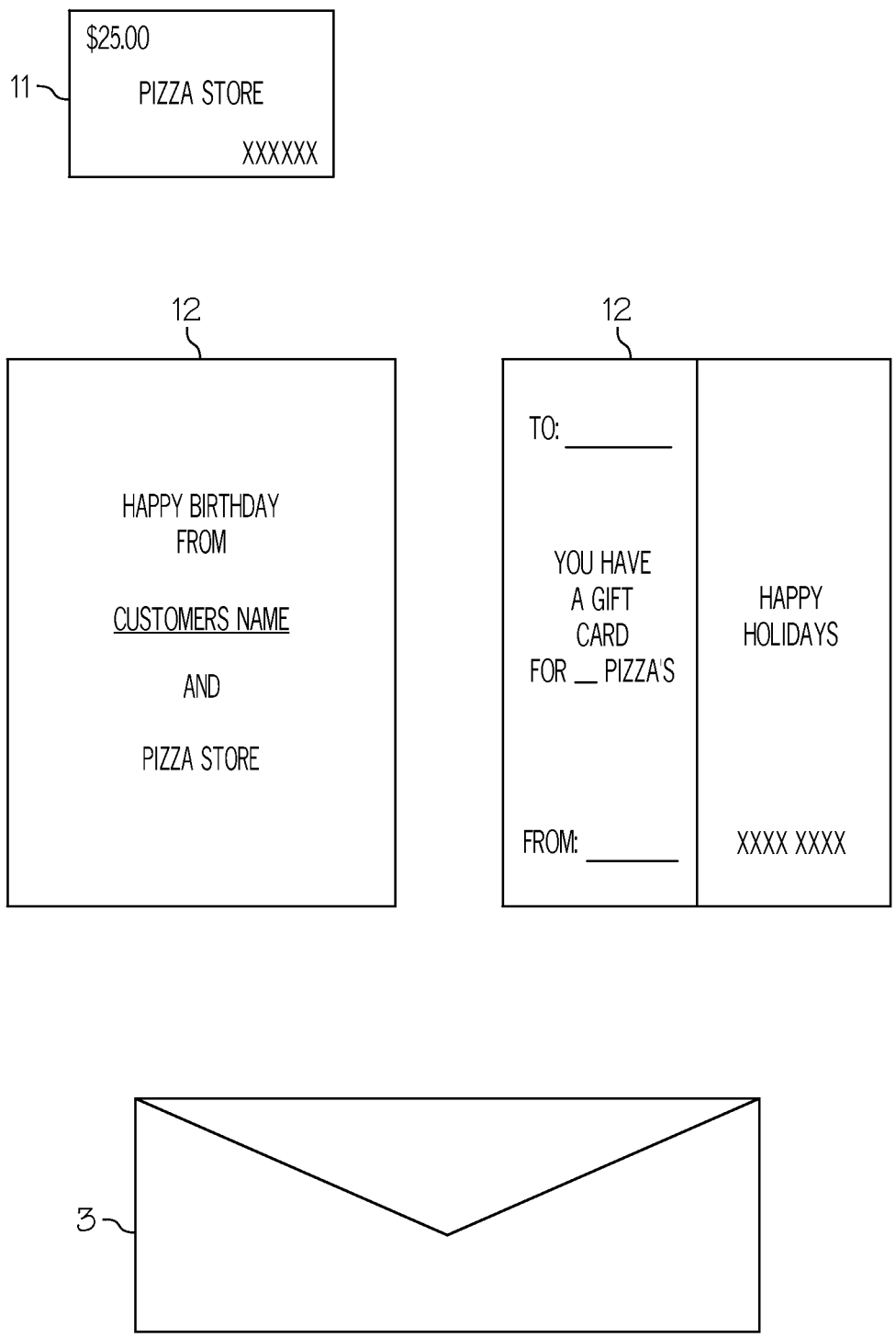
FIG. 2 is a top view of contents of a gift card package.

FIG. 2 shows a multi-piece approach with gift card(s) 11, and the addition of a greeting card(s) 12, and envelope(s) 13. In this an embodiment merchandise gift cards 11 are to be distributed as packages 10. Each gift card package 10 can contain a number of the same card 11 to be sold or given away free. For example: 12 gift cards each good for 6 free pizzas could be sold or given away free.

Each gift card package 10 may also contain a number of different merchandise cards 11. For example, one card redeemable for pizza, another card redeemable for a toy, and another card redeemable for a movie rental or movie on-demand, can be packaged together and sold or given away for free.

Each gift card package 10 may also contain a number of pre-fixed dollar amount gift cards (e.g., $10, $15, $20, and $25 gift cards) that may be sold or given away free. In another embodiment, a number of any dollar value gift cards can be packaged together and sold or given away free. In still another embodiment, multiple cards for various brands like Macy's, Saks, Bloomingdale's, Pizza Hut, etc., can be packaged as one product and sold or distributed free.

The gift cards products 10 also may contain any combination of additional components packaged as a single gift card product: gift cards 11, greeting cards 12, mailing envelopes 13 and catalogs (not shown) or menus (not shown) of choices of available food or merchandise.

In another embodiment, FIGS. 3A-3C, the gift card product 21 could be distributed at no cost, e.g., on top of pizza boxes 20, in delivery packages and shopping bags, piggy-backed with other items being mailed, in sample packs (see FIG. 3B), inserted into newspapers 22 and other publications, direct mailed, distributed at retail, as part of a greeting card, thrown on a drive way or hung on a door 23 (see FIG. 3C). In another embodiment the gift card product could be distributed as a for-pay product at retail.

Even though activation of the present invention may be made at retail, the present invention is designed to be activated remotely from a home, an office or any other remote location. Activation is accomplished by calling or going on-line to prepay for merchandise or to apply monetary value the gift cards. This is one factor that motivates gift card usage.

This method is more convenient because consumers need not stand in a checkout line to buy or activate a gift card, activation is done at the gift giver's convenience, and cards are activated as needed. The cards can be equipped with all the components needed to create a superior gift (premium), and packages can have multiple combinations of products and services.

The gift card product 10 may also be sold in a variety of sizes (FIGS. 1A-1C): (i) as a package of single or multiple gift cards 1, (ii) as a package of gift cards 1 with accompanying greeting cards 12 and envelopes 13, or (iii) as a single greeting card 11, gift card 12 and envelope set 13. Any of these combinations can also be packaged as multiples and inserted into a separate box or envelope.

Specific numbers 6, bar codes 7, other codes, magnetic stripes, memory chips or any other item used for the purposes of an identification, security and activation may also be included. For example, the numbers 6 can be a gift card number associated with a gift card account. The gift card account can include information related to one or more of a redemption item (e.g., specific goods, specific services, or money), personal information of the gift giver, and personal information of the gift recipient.

In addition, a greeting card 12 can also have a gift card and multi-page catalog affixed to it, a pop-up card, catalog, greeting card format. These individual products can be self-mailed or inserted into an envelope for mailing.

An important feature of the gift card package 10 is that it drives consumer traffic to specific stores. For example, during activation consumer traffic is driven to a store's website for online activation. This creates an additional selling opportunity. It drives visitors to specific web pages or allows viewers to find additional merchandise to substitute and/or add to their gift card amount. This online driver is particularly important, as the Internet becomes a new form of entertainment and sales with full motion video, audio, corporate sponsorship, and product placement.

Below is an example for using gift cards in a pizza delivery setting (see FIG. 4). The home delivery industry offers a wholly new market for prepaid or stored value card distribution. For example, use of pizza companies' direct-to-home delivery, with or without a new and more sophisticated ordering system, creates a new market for the gift card product and its convenience stimulates usage. The increased convenience also enhances trademark recognition and loyalty to the brand.

Figure 4:
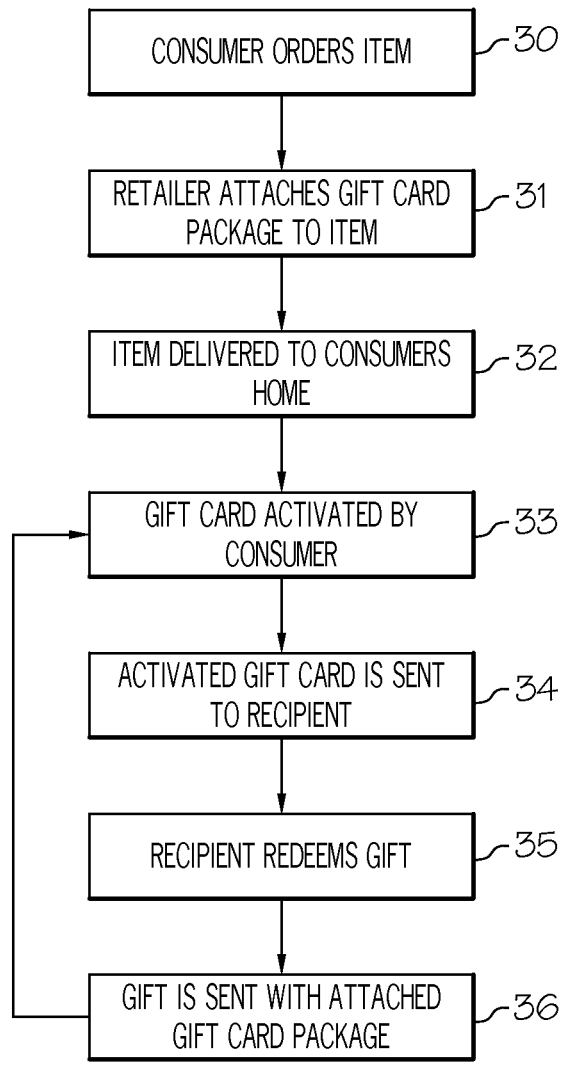
FIG. 4 is an exemplary flow chart illustrating steps of the gift card distribution method.

As shown in FIG. 4, a consumer orders a pizza from a pizza store 30. A gift card package containing a number of the gift card products (along with instructions for their use) are attached to a pizza delivery box 31 and distributed at the same time as an in-home (or in-office) pizza delivery and at no additional cost 32. The gift card packaging can be affixed to the top of the pizza box, be hand delivered simultaneous with the pizza delivery, or act as a door hanger.

Each individual gift card can be used to prepay the purchase of a cheese pizza, and can then be passed along as a gift to a number of recipients by the original pizza buyer. To activate the card, the original pizza buyer simply calls or goes online to a designated number or site, identifies themselves, enters the code on the card they have in hand (or the consumer may designate their own unique code), provides the appropriate payment debit or credit card information 33, and designates the person and address to whom they are sending the gift.

Then, the original pizza buyer activates the gift card, places it in the greeting card with the appropriate messaging, inserts both into the enclosed envelope, attaches his own stamp, and mails to the gift recipient 34. Because the card is hand addressed and mailed first class, the receiver will most likely recognize the sender, open the envelope, and feel good about receiving the gift. Their next course of action is to start the redemption process, stimulating a trail for customers who may not know or have used the specified gift brand before.

In order to redeem the gift, the recipient calls or visits the same number or site, identifies himself, and provides the number or code on their specific gift card and their level of redemption (the entire gift amount or a portion) 35. With that information, the order is confirmed and the gift recipient is urged to upgrade their order with extras, i.e., toppings, fountain drinks, etc., that may be paid at the time of delivery. At the same time, the gift recipient is asked if they want to send a thank you note to their benefactor.

When the gift pizza is delivered, it too has a package of gift cards adhered to its top to perpetuate the buying chain 36. The end result of the transaction is a database of sender and the receiver's names, addresses and phone numbers, credit information, the total number of pies purchased, and tracking for number of pies used. Additional information can be gathered which can be advantageous for security, general information, surveys and upgrading purposes.

System for Distributing Gift Cards and Advertising

Figure 5A:
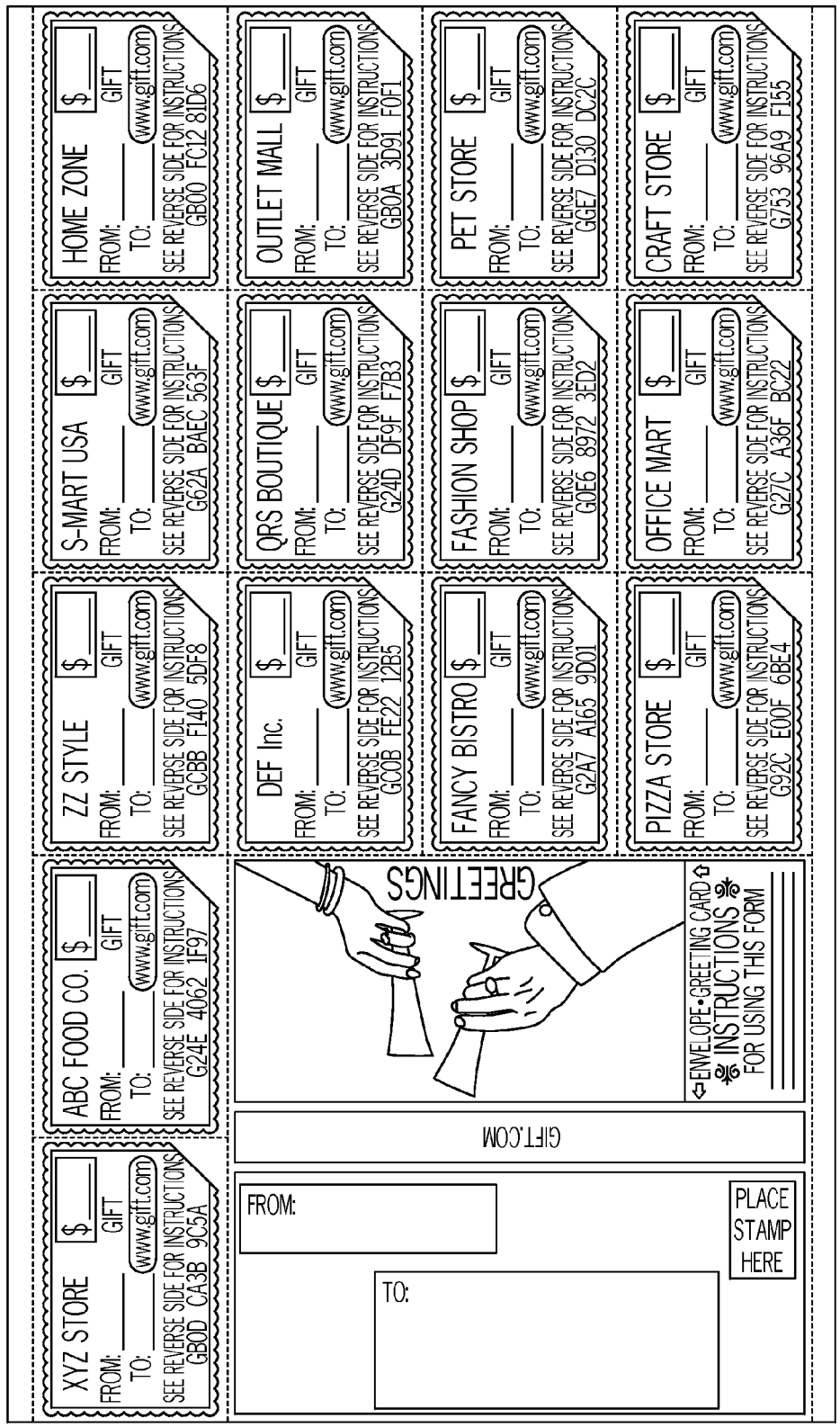
FIG. 5A is a top view of a unitary single-sheet gift card and advertising form.
Figure 5B:
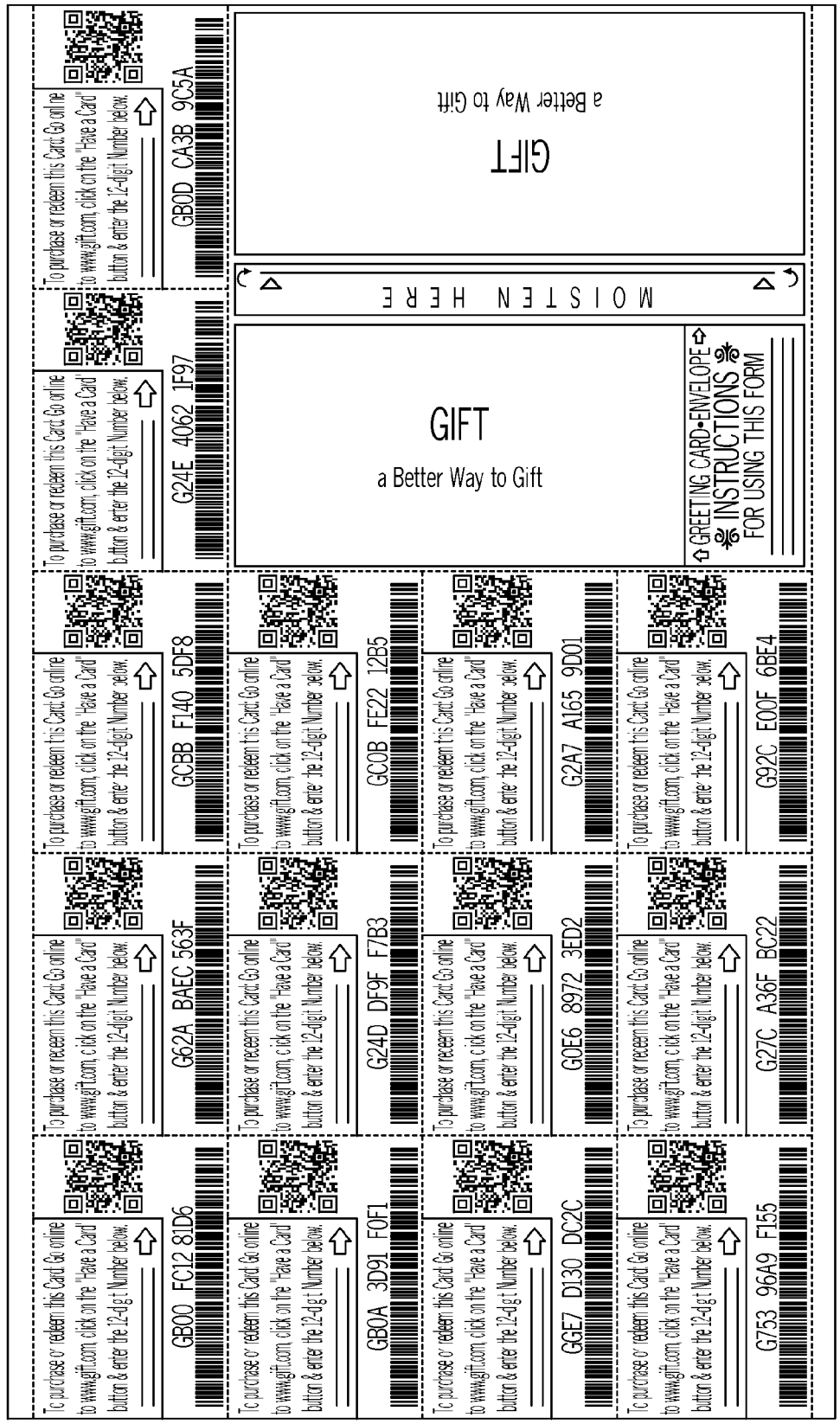
FIG. 5B is a bottom view of the unitary single-sheet gift card and advertising form of FIG. 5A.

The invention features a system for distributing gift cards and advertising. The system can include a unitary single-sheet form, a package envelope, an activation system, a delivery system, and a redemption system. As shown in FIGS. 5A and 5B, the unitary single-sheet form can feature a plurality of separable pieces that can include a plurality of non-activated gift cards, an optional gift envelope, and an optional correspondence piece. In embodiments of the system that do not include a gift envelope or a correspondence piece, the user (e.g., a gift giver) can obtain and use his or her own gift envelope or correspondence piece, or both as desired when delivering the gift card after activation to a gift recipient. The form can be a form that is printed during manufacturing, imprinted by a gift giver or other consumer or person after manufacturing, or both printed and imprinted. One or more of the forms can be inserted into the package envelope for delivery to the gift giver. In some embodiments, other sheets of material, e.g., advertising buck slips, may also be inserted into the package envelope along with the form or forms for delivery to the gift giver. As used herein, package envelope can mean an envelope, a wrapper, or other packaging suitable for enclosing one or more of the forms for delivery to the gift giver. In alternate embodiments in which the publication is bound or inserted in a magazine or newspaper, the magazine or newspaper can serve as the package envelope as a delivery means. In embodiments in which a plurality of the published forms are inserted into a package envelope, invoice envelope, or marriage mail envelope, are inserted into a magazine, newspaper, or other publication, are bound into a magazine, newspaper, or other publication, or are bound together in their own separate publication, the plurality of published forms create a publication.

The plurality of gift cards of each form and of each publication can include 2, 3, 4, 5, 6, 7, 8, 9, 10, 11, 12, 13, 14, 15, 16, 17, 18, 19, 20, 25, 30, or more non-activated gift cards. In one exemplary embodiment, the form can include eight non-activated gift cards. In another embodiment, the form may include only a single non-activated gift card. The plurality of gift cards can be arranged in rows, columns, or another arrangement on the sheet of material (e.g., paper) from which they are created, and may be separated from one another by cuttable lines of separation, tearable lines of separation, perforations, microperforations, die cut ticks, score lines, other suitable means of separation formed in or on the sheet of material between each of the plurality of gift cards, or a combination of any of the foregoing.

In some embodiments, the plurality of gift cards of the form can be pre-cut during manufacturing and may be attached to a plastic or wax-coated paper backing sheet from which each gift card may be peeled for activation and delivery from the gift giver to the gift recipient. In another embodiment, the plurality of gift cards of the form can be sealed beneath a plastic cover that can be peeled off and removed to reveal each, several, or all of the plurality of gift cards.

The form can be constructed so as to include multiple leafs that allow the form to be folded for easier insertion into the package envelope. In one embodiment, the form can be a two-sided bi-fold form having two leafs. The two leafs can be glued together. During manufacturing, a first side of the form can be printed with lithographic plates while a second side of the form can be printed by ink jet in single color or full color for variable printing of custom bar codes, numbers, graphics, images, alphanumeric text, and symbols.

Figure 6A:
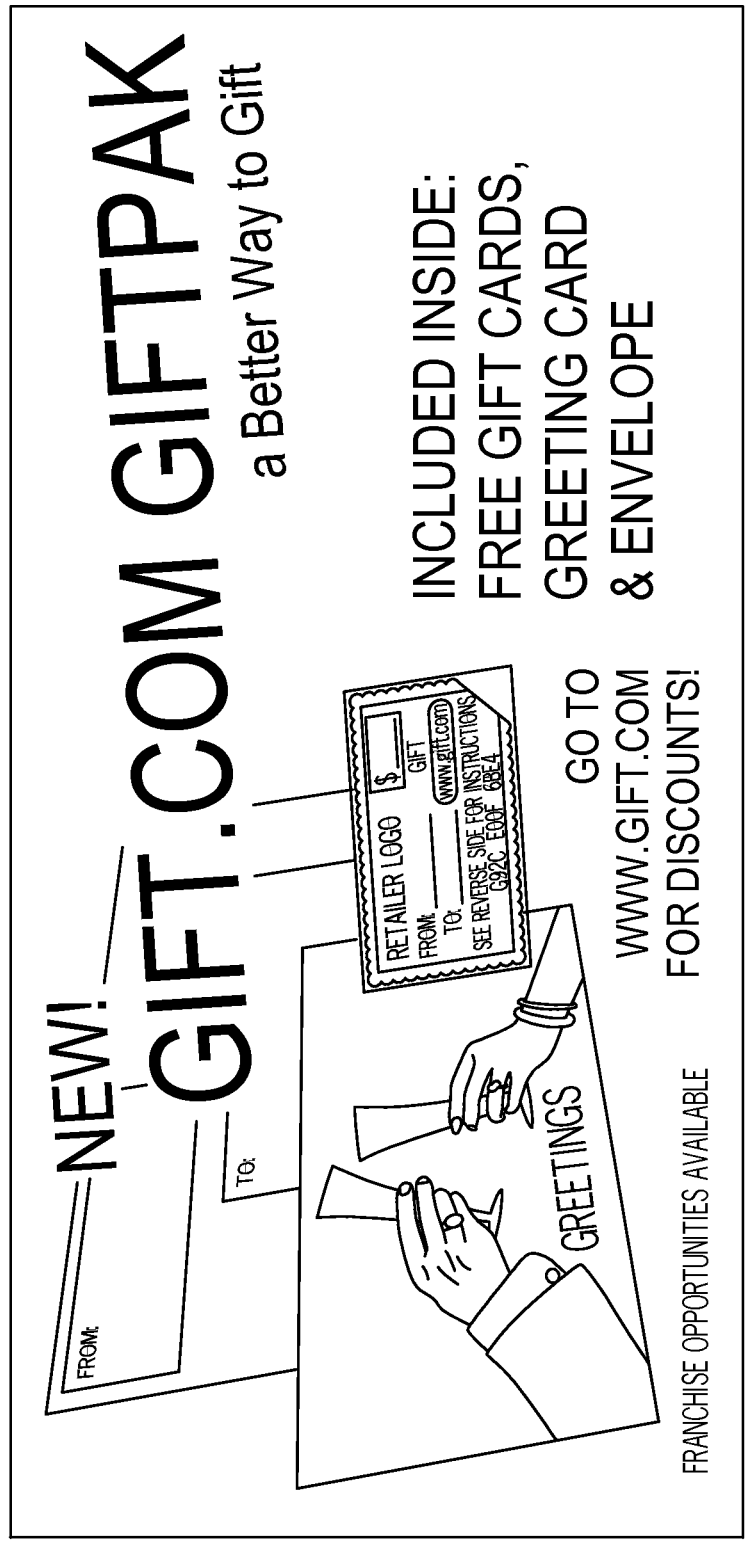
FIG. 6A is a top view of a package envelope into which the unitary single-sheet gift card and advertising form is insertable and sealable.
Figure 6B:
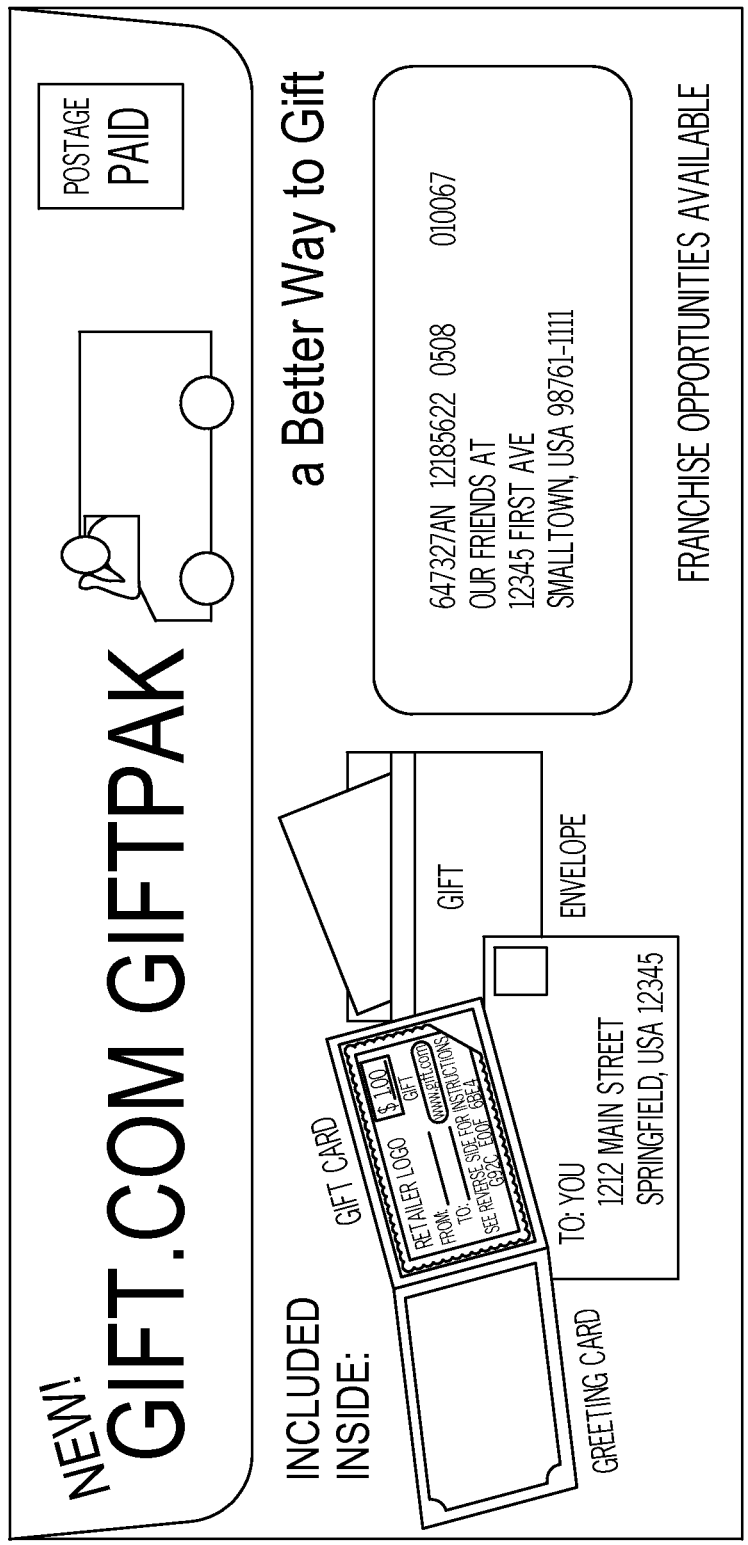
FIG. 6B is a bottom view of the package envelope of FIG. 6A.

One or more pieces of the form can feature printed information, which can be advertising. One or more of the forms are insertable into and sealable within the package envelope to create a publication package for delivery to the gift giver. One example of the package envelope is shown in FIGS. 6A and 6B. The activation system is used to activate at least one of the plurality of non-activated gift cards so as to create at least one activated gift card. The at least one activated gift card, and optionally the optional correspondence piece, are insertable into and sealable within the gift envelope to create a gift card package. The delivery system is used to deliver the gift card package from the gift giver to a gift recipient. The delivery system can be a postal system, courier service, retail distribution, or hand delivery. The redemption system can be used by the gift recipient to redeem the at least one activated gift card enclosed in the gift card package for a redemption item. The redemption item can be a product, a service, or money.

In one embodiment, one or more of the forms can be inserted as marriage mail into a billing envelope along with an invoice. For example, the form could be inserted into an envelope containing an invoice from a utility or cable television company. When the gift giver receives the company's invoice, the form with its plurality of non-activated gift cards are also included for the gift giver to activate and deliver to one or more gift recipients or to use personally as desired by the gift giver. In this embodiment, the system may omit the package envelope.

In another embodiment, one or of the forms can be inserted into or bound in a magazine or newspaper that is delivered to the gift giver. In this embodiment, the system may omit the package envelope.

Figure 7:
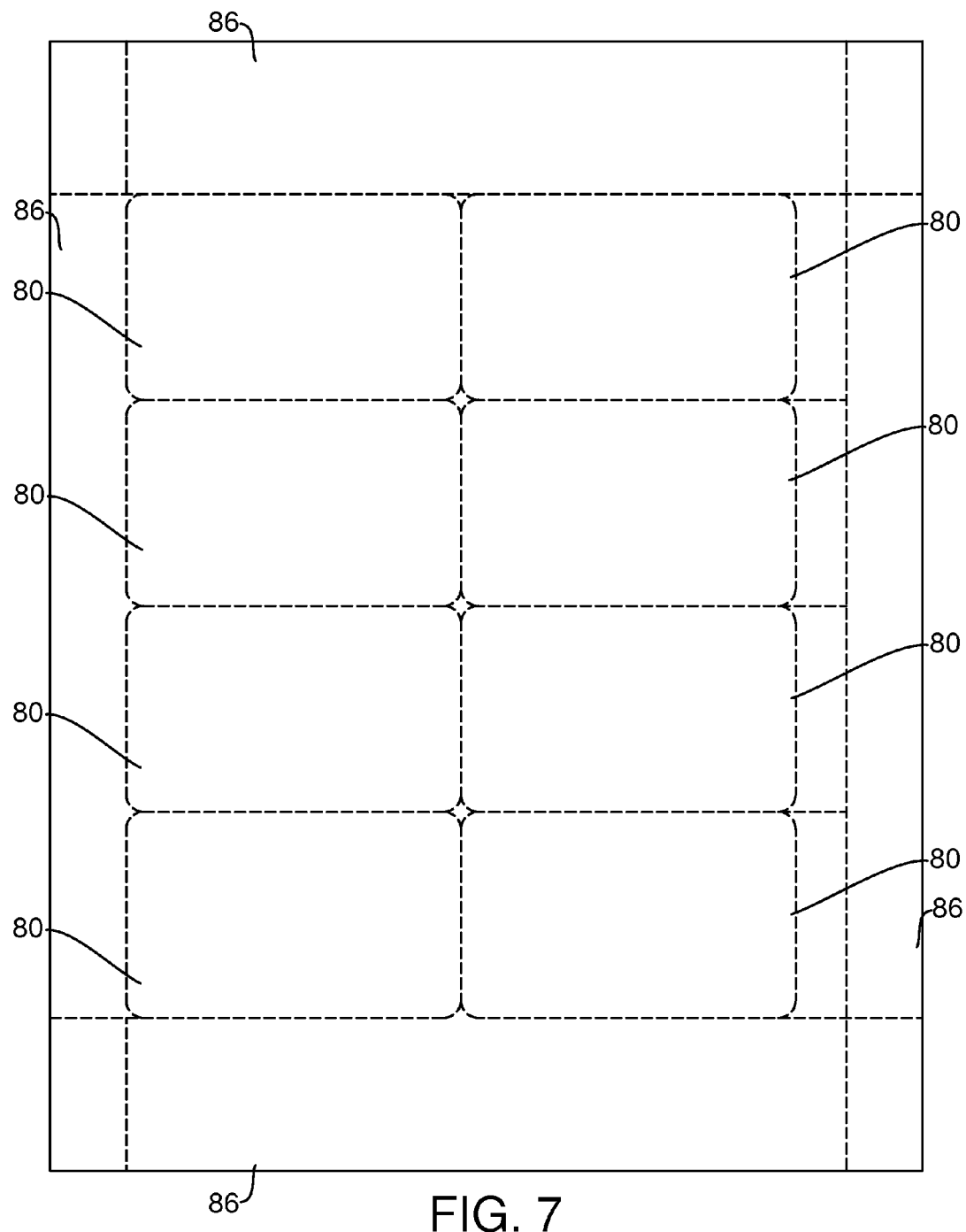
FIG. 7 is a top view of another embodiment of a unitary single-sheet gift card and advertising form. With the exception of the optional text shown printed thereon, a bottom view of this embodiment of the unitary single-sheet gift card and advertising form would be a mirror image of the top view, and therefore, is not shown in the drawings.
Figure 8A:
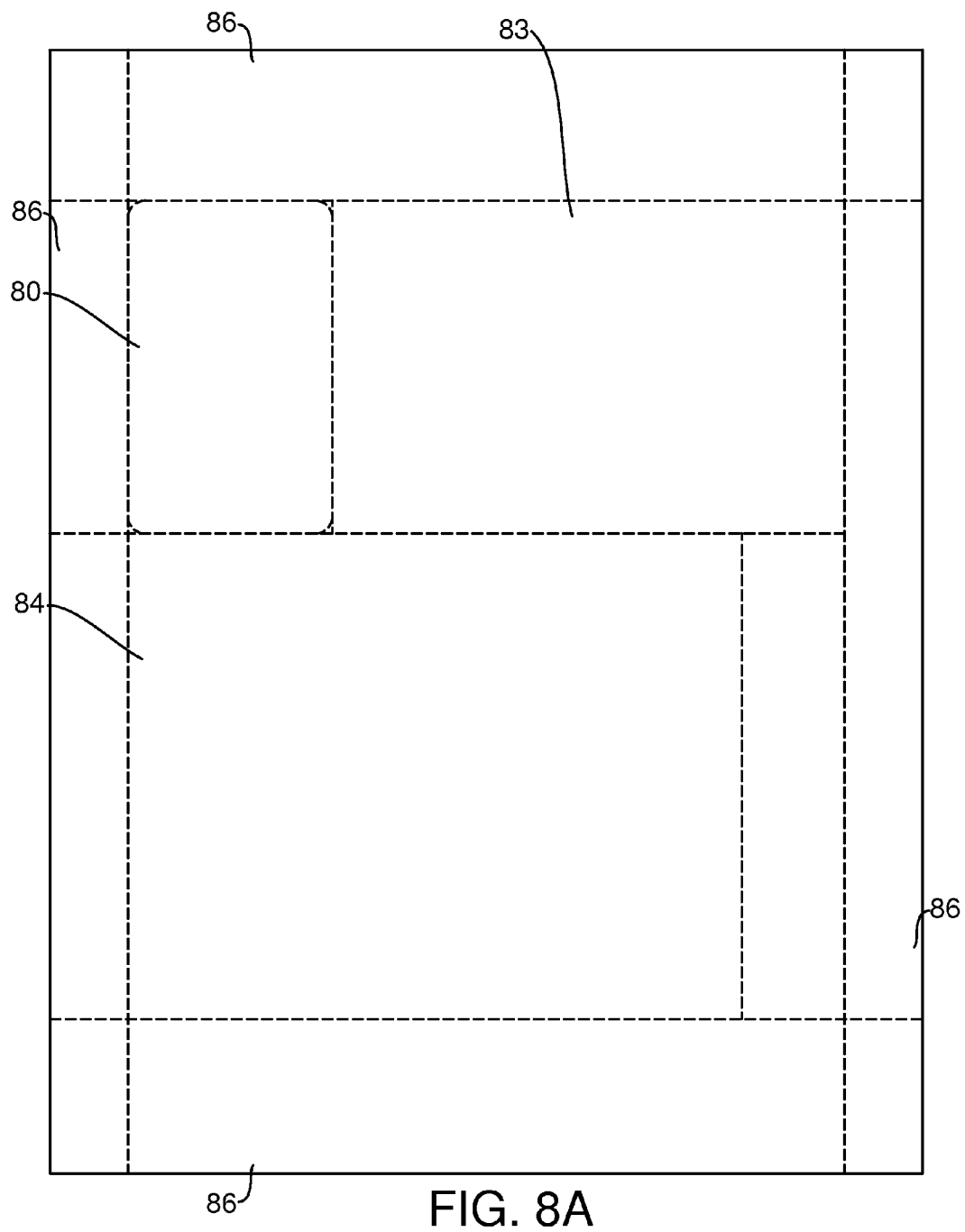
FIG. 8A is a top view of still another embodiment of a unitary single-sheet gift card and advertising form.
Figure 8B:
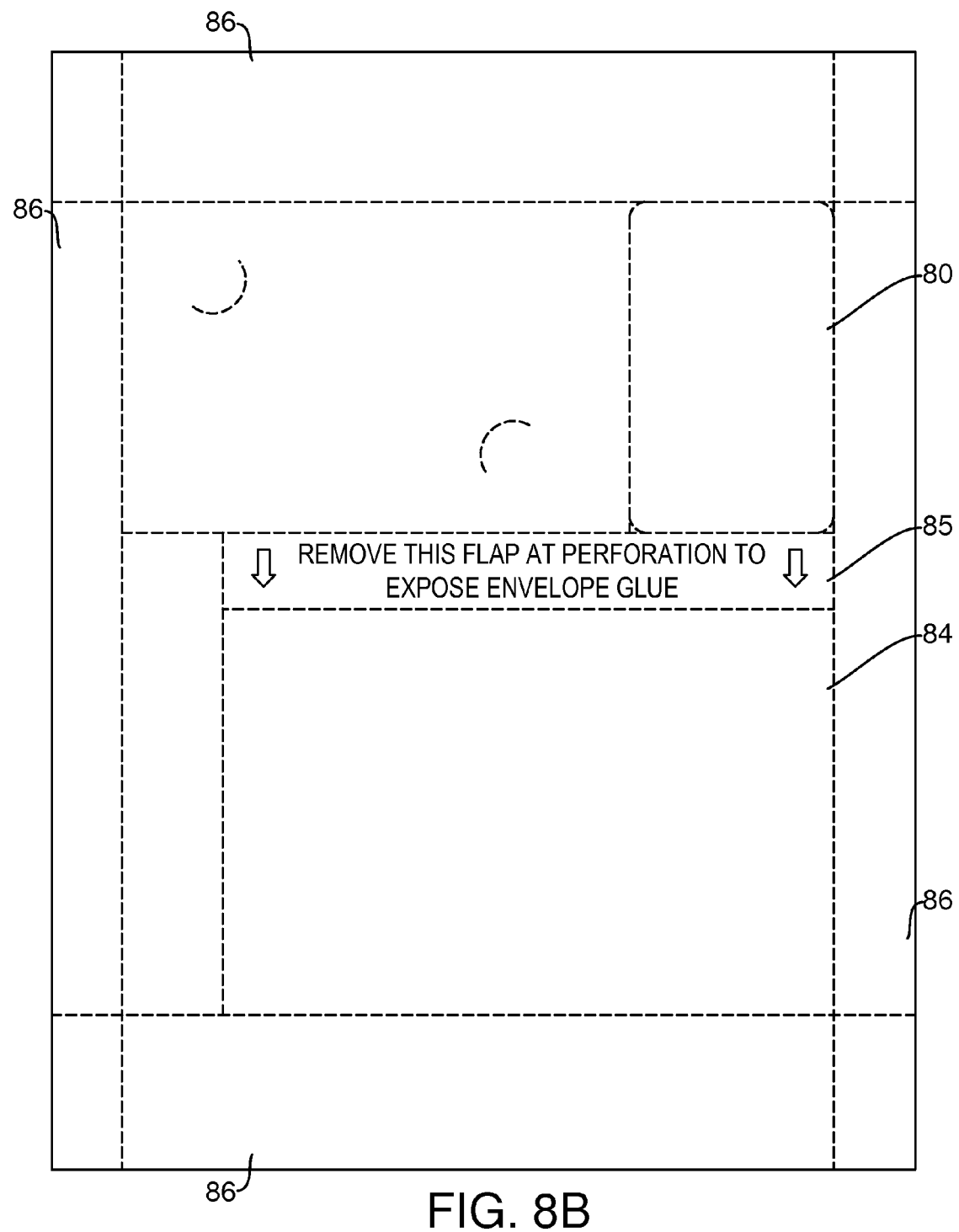
FIG. 8B is a bottom view of the unitary single-sheet gift card and advertising form of FIG. 8A with a detachable strip.
Figure 8C:
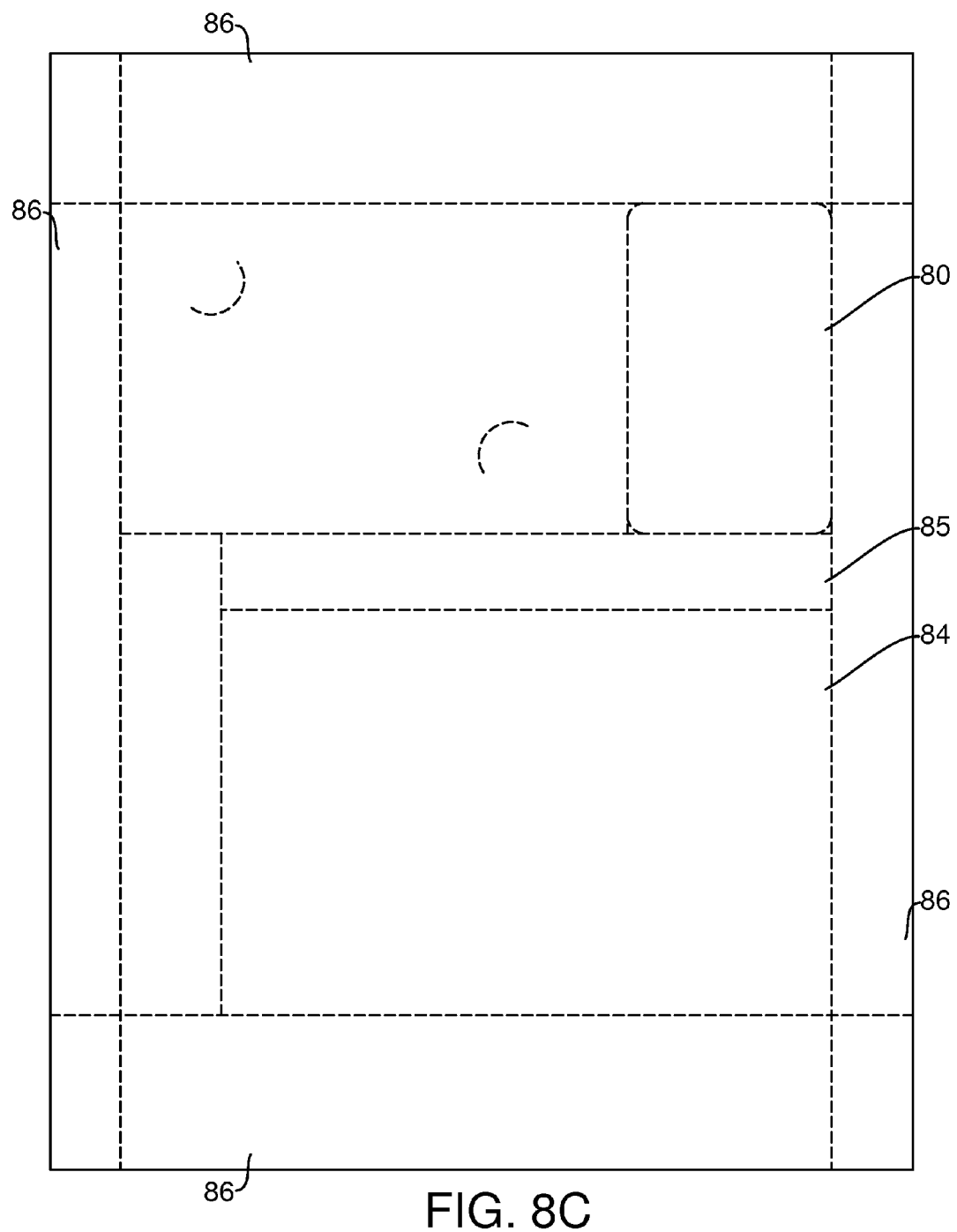
FIG. 8C is a bottom view of the unitary single-sheet gift card and advertising form of FIG. 8B with the detachable strip removed to reveal a slit of a gift envelope.

In an exemplary embodiment of the system, the form can feature two sheets of material (i.e., first and second sheets). The sheets may be combined to create a two-ply form. The form can be a self-mailer that includes address spaces for mailing direct to a consumer (i.e., to a gift giver) and for mailing the form by the gift giver directly to the gift recipient. The first and second sheets are printable and imprintable. As shown in FIGS. 8A-8C, the first sheet of this exemplary embodiment features a correspondence piece 83, a gift envelope 84 into which the correspondence piece can be inserted and mailed, and one or more optional pieces. The one or more optional pieces can be a single gift card 80, a buck slip, an instruction card, a transaction register, a photograph, an advertisement, or any other suitable item that is printable or imprintable. For purposes of enhancing the ability of the first sheet to be fed through a printing device, the first sheet can include one or more detachable frame elements 86 that may be removed and discarded after printing or imprinting, whichever step occurs last before mailing or delivery of the form to the gift recipient. The first sheet may also be constructed without frame elements. Detachable frame elements 86 may also be included in the sheet of FIG. 7.

In the exemplary embodiment described above, the second sheet can feature a plurality of non-activated gift cards arranged in columns or rows on the sheet and separated by any of the means of separation described herein. For purposes of enhancing the ability of the second sheet to be fed through a printing device, the second sheet can include one or more detachable frame elements that may be removed and discarded after printing or imprinting, whichever step occurs last before mailing or delivery of the form to the gift recipient. The second sheet may also be constructed without frame elements. Along with the correspondence piece, one or more of the gift cards may be detached from the first or second sheet, activated by the gift giver, and inserted into the gift envelope for delivery to the gift recipient.

The gift envelope and correspondence piece may be attached at a horizontal perforation so that the gift card form is foldable at the horizontal perforation. After all printing and imprinting is completed, the frame, if any, may be removed from around the gift envelope and the correspondence piece while those two pieces are left connected together at the horizontal perforation. One or more non-activated gift cards can be placed into a pocket of the gift envelope or inserted into the fold formed between the still-connected correspondence piece and gift envelope at the horizontal perforation. The gift card form may be distributed to the gift giver folded at the horizontal perforation around the article. In one embodiment, the article can be a sale receipt handed to the gift giver when the gift giver makes a purchase at a retail location, e.g., at a clothing store, a big-box retailer, a restaurant, or any other retail location.

The terms "print" and "printable" as used herein relate to printing on one or more of the plurality of separable pieces of the form and the package envelope during manufacturing, or printing on a surface of one of these components in a first instance by a manufacturer. The terms "imprint" and "imprintable" as used herein refer to printing on one or more of the plurality of separable pieces of the form and the package envelope by a user subsequent to manufacturing. Imprinting can be accomplished manually using a pen, pencil, or other handheld writing instrument, or mechanically using a printer or printing device. For example, the user may imprint customizations onto a blank correspondence piece in the first instance where the manufacturer has not printed any information on the correspondence piece of the form during manufacturing, or the user may imprint customizations in a second, third, fourth or other instance onto a form that includes information printed thereon by the manufacturer during manufacturing. By way of further example, a form that includes information printed thereon by the manufacturer during manufacturing is printed in the first instance, customizations subsequently printed onto the form by a user are imprinted in the second instance, and additional information thereafter printed onto the same form by the same user or by another user is imprinted in the third instance. Imprinting of the form can also be performed by the retailer.

The form forms a gift card mall that is deliverable directly to a gift giver or potential gift giver, for example, into a home, office, or other address of a gift giver or potential gift giver. For purposes of convenience, hereinafter, both gift givers and potential gift givers will be referred to as a gift giver. Like a conventional gift card mall display or kiosk found in a retail store, the "gift card mall in the home" of this system can provide a plurality of gift cards from different retailers or manufacturers from which the gift giver may select to activate and deliver to the gift recipient. The gift card mall of this system, however, provides the gift giver the ability to select a non-activated gift card for activation at the gift giver's home or office or from another location that is remote from a retail store. The gift giver can activate one or more of the non-activated gift cards for delivery to one or more gift recipients. Non-activated gift cards not initially activated by the gift giver can be saved for activation and delivery later to one or more gift recipients. The gift cards of the form can be for goods or services sold or provided by one or more retailers or manufacturers. In one embodiment, all of the gift cards in the form can be from a single retailer or manufacturer. In another embodiment, each of the gift cards in the form can be from a different retailer or manufacturer. In still another embodiment, the form can feature sets of two or more gift cards, wherein each set of gift cards is from a different retailer or manufacturer. In yet another embodiment, the gift cards of the form can be for money that can be used to purchase goods or services from a retailer, manufacturer, service provider, or other card issuer. In another embodiment, the gift cards of the form can be for specific goods or services from a retailer, manufacturer, service provider, or other card issuer. As used herein, the term retailer shall also include service providers in addition to retailers of goods and other merchants. The form's plurality of gift cards can be from local retailers, national retailers, or a mixture of both local and national retailers. Gift cards of the system that are issued by or are specific to manufacturers can be used at any store (brick-and-mortar, telephonic, or online) that sells the manufacturer's goods and agrees to accept the gift cards. In one embodiment, one or more of the plurality of gift cards can be co-branded with both retailer and manufacturer's names and advertising information.

In addition to serving as a system for gifting and distribution of gift cards to gift givers, the system also serves to distribute advertising from one or more advertisers. The one or more advertisers can be retailers, manufacturers, or other card issuers. Once activated by the gift giver, the activated gift card can be redeemed through the redemption system by the gift recipient. The redemption system may be operated by the card issuer, which can be a retailer, a manufacturer, or a system provider. The system provider can be a party, e.g., a company or individual, that operates the system by performing one or more of the functions of: creating the form and publication package; delivering the non-activated gift cards to the gift giver; providing online, telephonic, in-store, or other means for funding and activating the non-activated gift cards; and permitting redemption of the activated gift card by the gift recipient for the redemption item.

In one embodiment, the gift cards of the form can be closed loop cards in that the gift cards are redeemable for redemption items sold, distributed, or provided only by the retailer or manufacturer identified on each gift card. In another embodiment, the gift cards of the form can be open loop cards in that the gift cards are redeemable for redemption items sold, distributed, or provided by any retailer or manufacturer who has agreed to or is authorized to accept the gift cards for the purchase of goods or services.

In one embodiment of the system, the system provider may create a form featuring gift cards from a plurality of different retailers or manufacturers. In this example, a retailer and manufacturer may permit the system provider to allow the gift recipient to use the activated gift card received from the gift giver for the redemption of the redemption item from a different retailer or manufacturer. In another example, the retailer or manufacturer may restrict redemption of the gift card only for redemption items sold, distributed, or provided by that retailer or manufacturer. As a condition of using the system provider's service, the system provider may require that participating retailers, manufacturers, and other card issuers permit the redemption of an activated gift card for redemption items sold, distributed, or provided by other participating retailers, manufacturer, or other card issuers.

After activating and delivering one or more of the plurality of gift cards to one or more gift recipients, the remaining non-activated gift cards can be retained by the gift giver for future activation and delivery to the same one or more gift recipients or to one or more different gift recipients.

During manufacturing, the form can be formatted to maximize the number of forms that can be packaged for Flat Rate Standard Mail in accordance with the United States Postal Service ("USPS") Direct Mail Manual specifications and regulations for USPS Flat Rate Standard Mail. To comply with USPS regulations and specifications applicable to USPS Flat Rate Standard Mail, the publication package containing the plurality of forms can be a minimum of about 6 inches wide×5 inches long with about 0.125-inch radius rounded corners and the packaged forms can be no more than about 0.75 inches in thickness from any edge of the package. The publication package can be flexible so that the package is capable of bending one inch from any edge without affecting the contents inside the package. The publication package can also be a uniform thickness so that any bumps, protrusions, or other irregularities do not cause more than one-quarter of an inch in variance in the thickness of the package. These dimensions minimize the postage expense for mailing each publication package. The paper from which the forms are constructed may be almost any weight, but in exemplary embodiments, can be 50 lb. or 60 lb. base weight uncoated book paper or 20 lb. or 24 lb. base weight bond weight paper. Using the 24 lb. bond paper or the 60 lb. uncoated book paper, a plurality of forms, each including a single sheet, can be packaged within a single publication package for delivery or distribution to a consumer as USPS Flat Rate Standard Mail. If lighter weight papers such as the 20 lb. bond paper or the 50 lb. uncoated book paper are used, more than thirty forms may be packaged and shipped in a publication package to a consumer using USPS Flat Rate Standard Mail rates. The exact number of forms that can be inserted into the publication package is also dependent on whether the forms are single-ply, double-ply, multi-ply, or a combination of the foregoing.

In an exemplary embodiment, the system can further include an online gift card mall accessible via a computer connected to a telecommunications system. The computer can be a personal desktop computer, laptop computer, a server accessed directly or via a network, a tablet computer, a mobile device (e.g., a cellular phone, smart phone, personal digital assistant, tablet computer, or any other mobile device having a communicative connection to the telecommunications system), a smart television, or any other suitable computing device that can be connected to telecommunications system such as, for example, the Internet. The activation system and the redemption system are accessible via the online gift card mall so that activation of the at least one activated gift card and redemption of the at least one activated gift card for the redemption item can be performed online via the online gift card mall.

The online features of the system may also be accessed via computers that are mobile platforms such as software installed on or accessible from a cellular phone, smart phone, personal digital assistant, tablet computer, or any other mobile device having a communicative connection to the telecommunications system.

The invention also features a gift card and advertising form. The form can feature a unitary single-sheet form, which can include a plurality of separable pieces. The plurality of separable pieces can feature a plurality of non-activated gift cards, a gift envelope, and an optional correspondence piece. One or more pieces of the form can feature printed information, which can be advertising. The plurality of separable pieces can be removably connected to one another as components of the unitary single-sheet form at cuttable lines of separation, tearable lines of separation, perforations, die cut ticks, score lines, or a combination of any of the foregoing. In exemplary embodiments, the form is manufactured from paper. In other embodiments, the form can be manufactured from plastic.

In some embodiments, the gift card and advertising form can feature one or more optional pieces. In an exemplary embodiment, the correspondence piece can be an optional piece that is includes as a separable piece of the gift card and advertising form. Other possible optional pieces include, but are not limited to, a register for manually recording transactions made using the activated gift card, a photograph, a buck slip, an instruction piece having instructions for activating the gift card or using the system, an advertisement, a coupon, an informational piece, or any other suitable piece that can be printed or imprinted and form a separable piece of the gift card and advertising form.

Various embodiments of the gift card and advertising form can feature varying numbers of non-activated gift cards. For example, the embodiment shown in FIGS. 5A and 5B includes fourteen non-activated gift cards. In another example, the embodiment shown in FIG. 7 includes eight non-activated gift cards 80. In still another example, the embodiment shown in FIGS. 8A-8C includes a single non-activated gift card 80.

In one embodiment of the gift card and advertising form, each of the plurality of non-activated gift cards can be specific to a different retailer, selling goods or services for which one of the plurality of non-activated gift cards is redeemable. In another embodiment of the gift card and advertising form, each of the plurality of non-activated gift cards can be specific to a different manufacturer, providing goods or services for which one of the plurality of non-activated gift cards is redeemable. In yet another embodiment of the gift card and advertising form, each of the plurality of non-activated gift cards can be specific to a product or service that is different from the product or service related to any other gift card in the form.

In one embodiment of the gift card and advertising form, at least two of the plurality of non-activated gift cards can be specific to a single retailer, selling goods or services for which one of the plurality of non-activated gift cards is redeemable. In another embodiment of the gift card and advertising form, at least two of the plurality of non-activated gift cards can be specific to a single manufacturer, providing goods or services for which one of the plurality of non-activated gift cards is redeemable. In still another embodiment of the gift card and advertising form, at least two of the plurality of non-activated gift cards can be specific to a single product or service that is different from products or services related to any other non-activated gift cards in the form.

The gift card and advertising forms constitute a new form of media that permit retailers, manufacturers, advertisers, and system operators to distribute not only gift cards but other printed media as well, e.g., advertising, informational materials, instructions, and entertainment-related materials such as commercial games associated with advertising-supported rewards point systems that may be used by a consumer to earn and redeem points for goods, services, or money. This new form of media may also be used with and include one or more websites operated in conjunction with the distribution of the forms, which present entertainment-related materials, e.g., images, text, videos, animations, or commercial games. The published forms can be interconnected with the website or websites so that the forms drive traffic to the one or more websites so that users (e.g., consumers who are gift givers or gift recipients) to view and listen to interactive media presentations related to products and services. The one or more websites may also be used by the gift recipient to send a thank you note to the gift giver to express the gift recipient's gratitude for the gift card and its associated gift giver-selected or gift recipient-selected redemption item. In this way, the exchange of information is bi-directional using the forms and associated websites for communications between the gift giver and gift recipient and between the gift giver or gift recipient and the retailer in the form of actual correspondence as well as reviews and data compiling related to the retailer's goods or services.

FIG. 8A shows an exemplary embodiment of the unitary single-sheet gift card and advertising form. In the exemplary embodiment, the form can include two connected plies. In other embodiments, the form can be created from a single ply or from three, four, five, or more plies (or sheets) of material. The two connected plies can include a first ply forming a front side of the form and a second ply forming a rear side of the form. The gift envelope of the form can include a perforation and a slit that are present on the second ply and together create a detachable strip that covers a glue area of a lid of the gift envelope 84. The slit forms an opening into a pocket of the gift envelope into which one or more of the plurality of gift cards, correspondence piece, or other separable components may be inserted for delivery to the gift recipient. As shown in FIGS. 8B and 8C, the detachable strip conceals the slit in addition to the glue area.

As shown in FIGS. 8B and 8C, the detachable strip 85, perforation, and slit are located on the glue-side (featuring an adhesive strip or glue area) of a lid of the envelope. The slit is cut along a bottom edge of the detachable strip so that the detachable strip 85 is separated from a top portion of a pocket side of the gift envelope. (Before the slit is cut, the detachable strip forms a part of the pocket side of the gift envelope from which it is separated once the cut is made to create the slit.) The perforation is formed along a top edge of the detachable strip 85 so that the detachable strip 85 is removable from its position over the glue area of the gift envelope's lid. The detachable strip 85 can be removed by tearing the perforation when the gift envelope 84 is detached from the form. The glue area can be uncovered once the detachable strip 85 is removed so that the glue area of the lid is capable of being used to seal the gift envelope 84. Once the detachable strip 85 is removed from the glue area, the glue area is uncovered so that the glue area can be used to seal the lid of the gift envelope 84 thereby securely enclosing the inserted contents inside, and the detachable strip may be discarded. The detachable strip may include printed or imprinted instructions for its removal.

Figure 9:
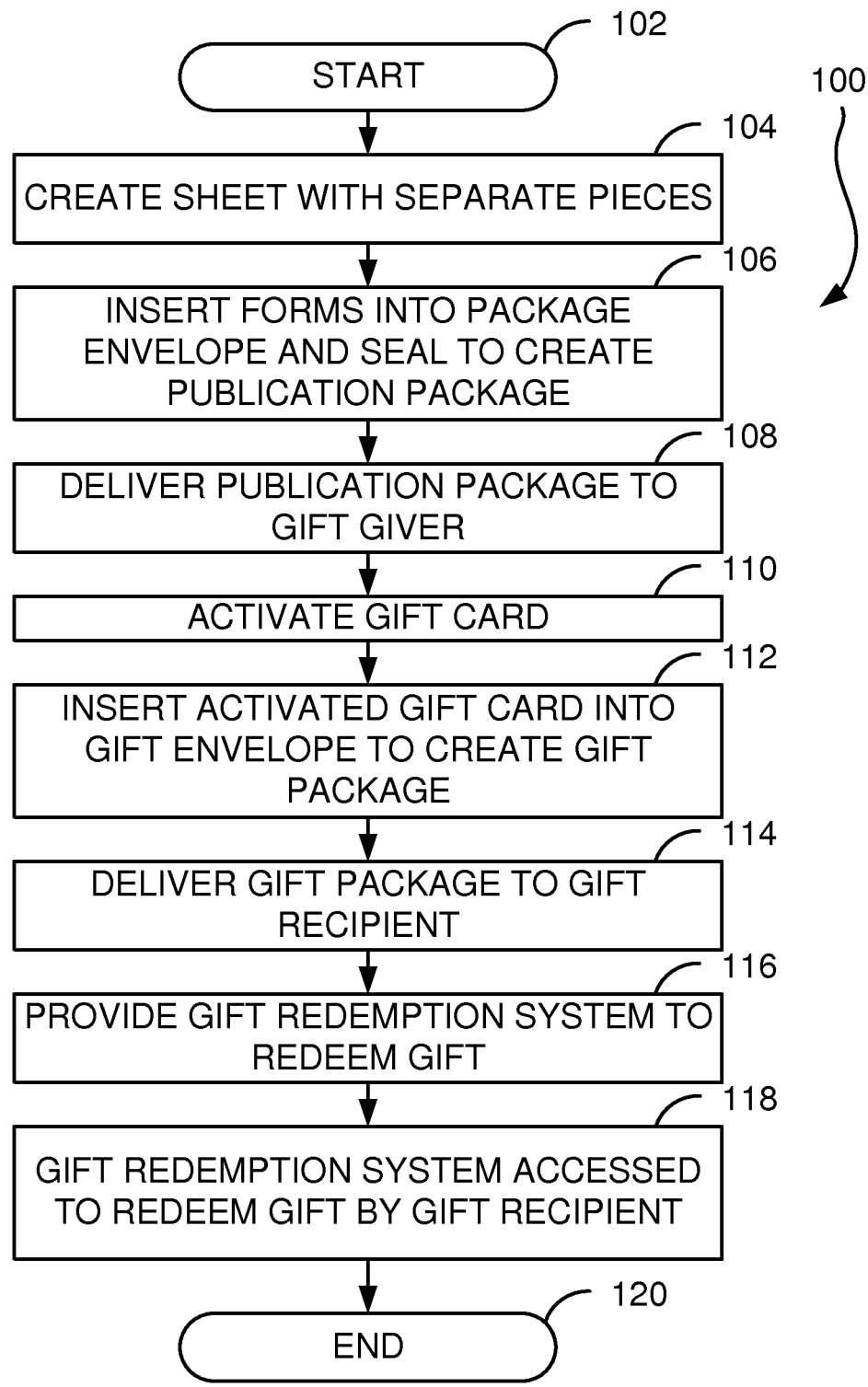
FIGS. 9-11 are flowcharts illustrating methods of distributing and using the gift cards, according to various embodiments of the present invention.

The invention also pertains to a method for distributing gift cards and advertising, which will now be discussed along with flowchart 100 of FIG. 9. In one step of the method, starting at Block 102, a unitary single-sheet form featuring a plurality of separable pieces is created (Block 104). The plurality of separable pieces can feature a plurality of non-activated gift cards, a gift envelope, and an optional correspondence piece. One or more pieces of the form can include printed information, and the printed information can include advertising. In another step of the method, one or more of the forms can be inserted and sealed into a package envelope to create a publication package (Block 106). In a next step of the method, the publication package can be delivered to a gift giver (Block 108). Using an activation system, in a next step of the method, at least one of the plurality of non-activated gift cards can be activated so as to create at least one activated gift card (Block 110). In a next step of the method, the at least one activated gift card, and optionally the optional correspondence piece, can be inserted and sealed into the gift envelope to create a gift card package (Block 112). In a next step of the method, the gift card package can be delivered to a gift recipient selected by the gift giver (Block 114). Finally, a redemption system can be provided whereby the gift recipient can redeem the at least one activated gift card enclosed in the gift card package (Block 116).

In another step of the method, the activation system and the redemption system can be accessible via a computer connected to a telecommunications system so that activation of the at least one activated gift card and redemption of the at least one activated gift card for a redemption item are performable online via the online gift card mall (Block 118). The operation may then terminate at Block 120.

Figure 10:
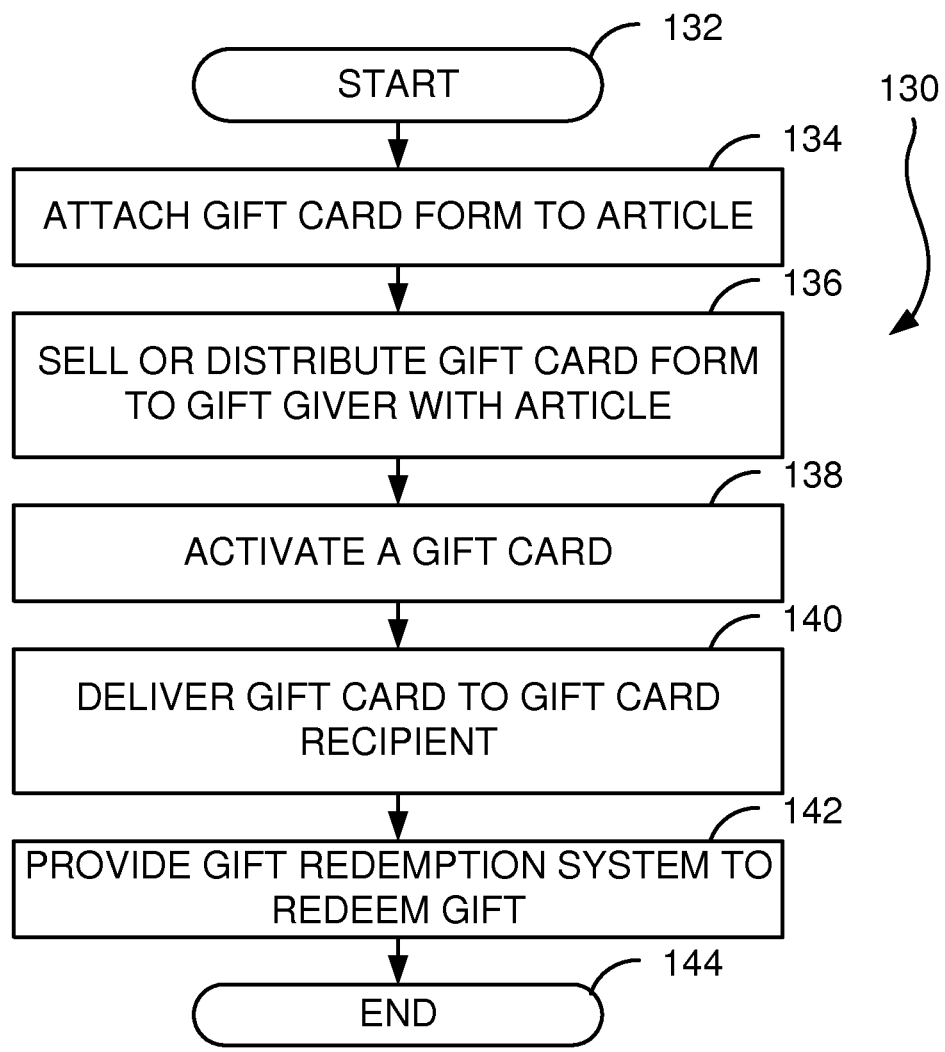

The invention can also feature a method for distributing gift cards and advertising, which will now be discussed along with flowchart 130 of FIG. 10. In one step of the method, starting at Block 132, a gift card form can be attached to an article that is different from the gift card form's own packaging (Block 134). The article can be, for example, a product sold or distributed in commerce, product packaging of a product sold or distributed in commerce, a shopping bag, a door hanger, a newspaper or other publication, or a direct mail advertisement. The gift card form can feature at least one unitary single-sheet form featuring a plurality of separable pieces. The plurality of separable pieces can include a plurality of non-activated gift cards, a gift envelope, and an optional correspondence piece. One or more pieces of the form can feature printed information and wherein the printed information features advertising. In a next step of the method, the article can be sold and distributed to a gift giver with the gift card form being provided simultaneously therewith so as to deliver the gift card form to the gift giver with the article that was sold or distributed to the gift giver (Block 136). In a next step of the method, using an activation system, at least one of the plurality of non-activated gift cards can be activated so as to create at least one activated gift card. In a next step of the method, the at least one activated gift card, and optionally the optional correspondence piece, can be inserted and sealed into the gift envelope to create a gift card package (Block 138). In a next step of the method, the gift card package can be delivered to a gift recipient selected by the gift giver (Block 140). Finally, a redemption system can be provided whereby the gift recipient can redeem the at least one activated gift card enclosed in the gift card package (Block 142). The operation may then terminate at Block 144.

In this method, the delivery step of the method can further include the step of delivering the gift card package to the gift recipient with a second gift card form to perpetuate a buying chain, wherein the buying chain is perpetuated when the gift recipient becomes a second gift giver by activating at least one of a plurality of non-activated gift cards of the second gift card form and delivers the at least one activated gift card of the second gift card form to a second gift recipient. The sale or distribution step of the method can further include the step of allowing a consumer to buy the article at a retail store. The sale or distribution step of the method can also further include the step of allowing the gift recipient to purchase the article via telephone and delivering the article to a home of the gift recipient. The sale or distribution step of the method can also further include the step of allowing the gift recipient to buy the article via a telecommunications network and delivering the article to a home of the gift recipient.

In this method, the article can be sold to the gift recipient at a specific point of purchase. The specific point of purchase can be a store. The store can be a brick-and-mortar retail store or an online virtual store that is accessible via a telecommunications network.

The activation step of the method can be performed by the gift giver. In this method, the activation step can be performed at a location remote from the store. In one embodiment, the activation step of the method can include the step of having the gift giver allocate a dollar value to the activated gift card by transferring funds to a gift card account associated with the specific activated gift card that is activated by the gift giver.

Using the method, in one embodiment, at least one of the optional correspondence piece and the envelope can be personalized for a specific occasion. In another embodiment, at least one of the optional correspondence piece and the envelope can be personalized for a non-specific occasion. The advertising can be personalized advertising selected based on data available to an advertiser creating the advertising concerning the gift giver's specific demographics and interests. Other personalized information can be printed or imprinted on at least one of the optional correspondence piece and the envelope including the gift giver's name and address or other contact information, the gift recipient's name and address or other contact information, a personalized message from the gift giver to the gift recipient, other alphanumeric text, images, graphics, or symbols.

In this method, the redemption system can be located at a brick-and-mortar retail store so that the at least one activated gift card is redeemable at the retail store. The redemption system can be an online retail store accessible remotely via a telecommunications network so that the at least one activated gift card is redeemable remotely via the online retail store.

Figure 11:
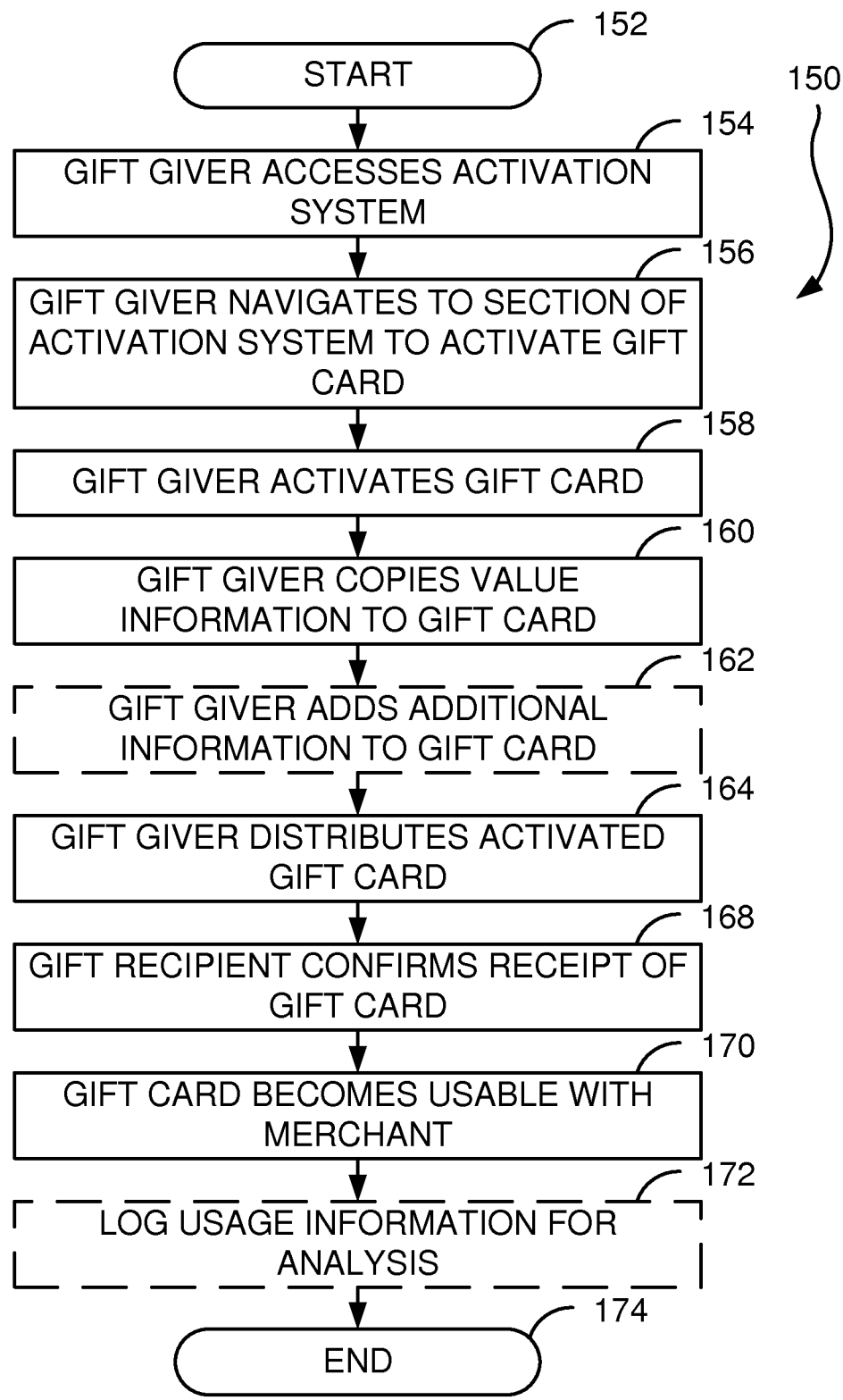

In certain embodiments of the method, the method can use a gift card form that includes the gift envelope being attached at a horizontal perforation to the at least one non-activated gift card and the one or more optional pieces, which will now be discussed along with flowchart 150 of FIG. 11. The gift card form can be foldable at the horizontal perforation. The gift card form can be handed or otherwise delivered to the gift giver folded at the horizontal perforation around the article, and the article can be a receipt handed to the gift giver when the gift giver makes a purchase at a retail location.

In one example, the method may begin at Block 152, wherein a gift giver of the gift card may access an activation system (Block 154). The activation system may be presented via a webpage or other communication interface. The location of the activation system may be provided by the gift card form, which may be included a specific part, or a sub-section, and/or a specific page of the printed gift card form. The gift giver may then access a webpage and/or microsite page of the activation system for the purpose of activation and/or adding value to one or more gift cards included on the gift card form (Block 156).

The gift giver may then activate the gift card using the activation system (Block 158). Activating the gift card may include transferring a value to be associated with one or more gift card included on the gift card form. The gift giver may then be instructed to copy or write the value and other information on the gift cards of the printed form that have been activated and supplied with a value (Block 160). The gift giver may also optionally include additional information on other parts of the gift card form, for example, a greeting card or envelope (Block 162).

The gift giver may then be instructed by the activation system to distribute one or more of the gift cards on the printed gift card form, which may have been activated, to a gift recipient (Block 164). Skilled artisans will appreciate that the gift giver can also be the gift recipient in some instances. For example, the gift giver may retain a gift card to be used by the gift giver at a later time. In the interest of clarity, throughout the rest of this example, the gift recipient will be presumed to be a separate person than the gift giver, without imposing any limitation on the present invention.

The gift recipient may be instructed to access a redemption system and confirm receipt of the gift card (Block 166). The redemption system and the activation system may be separate systems or the same system. Alternatively, the redemption system and activation system may be separate but related microsite pages of the same system or webpage. Instructions for confirming receipt of the gift card may be included on the gift card, as part of the gift card form and/or gift card package, or be otherwise communicated to the gift recipient.

Upon confirmation that the gift card has been received by the gift recipient, the gift card may be enabled to be used with a merchant (Block 168). More specifically, an activated and confirmed gift card may be used to transfer at least part of the value included by the gift card to one or more merchant. The transfer of value from the gift recipient to the merchant may be made at a brick-and-mortar or virtual online retail store (Block 170).

As an added benefit, the interactions of the gift giver, gift recipient, and/or merchant with the activation and/or redemption systems may optionally be monitored. A log may be created to record the interactions of each user. The log may be accessible by accessing the system, for example, via the internet. The collected information may be processed, for example by a computerized system, to generate receipts and/or reports of activities accomplished by any of the users (Block 172). The operation may then terminate at Block 174.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for distributing gift cards and advertising, comprising:

a unitary single-sheet form comprising a plurality of separable pieces, wherein the plurality of separable pieces comprises: a plurality of non-activated gift cards and an optional correspondence piece; wherein one or more pieces of the form comprises printed information and wherein the printed information comprises advertising;

a gift envelope, wherein the gift envelope is optionally one of the plurality of separable pieces;

a package envelope into which one or more of the forms are insertable and sealable to create a publication package for delivery to a gift giver;

an activation system for activating at least one of the plurality of non-activated gift cards so as to create at least one activated gift card using a code that is customizable, wherein the code of the at least one of the plurality of non-activated gift cards is associated with a gift card account after the unitary single-sheet form is manufactured and during activation to create the at least one activated gift card, wherein the at least one activated gift card, and optionally the optional correspondence piece, are insertable into and sealable within the gift envelope to create a gift card package;

a delivery system for delivering the gift card package from the gift giver to a gift recipient; and a redemption system operable by the gift recipient using a computer over the Internet whereby the gift recipient can redeem the at least one activated gift card enclosed in the gift card package for a redemption item;

wherein the code is assignable to the gift card subsequent to manufacturing to permit variable imprinting of custom codes.

2. The system of claim 1, wherein the redemption item comprises a product, a service, or money.

3. The system of claim 1, wherein the delivery system comprises a postal system, courier service, or retail distribution; and wherein the at least one activated gift card is deliverable via the delivery system or online transmission.

4. The system of claim 1, wherein the system further comprises an online gift card mall accessible via a computer connected to the Internet, and wherein the activation system and the redemption system are accessible via the online gift card mall so that activation of the at least one activated gift card and redemption of the at least one activated gift card for the redemption item are performable online via the online gift card mall.

5. A gift card and advertising form, comprising a unitary single-sheet form comprising a plurality of separable pieces, wherein the plurality of separable pieces comprises: a plurality of non-activated gift cards to be activated using a code that is customizable, a gift envelope, and an optional correspondence piece; wherein one or more pieces of the form comprises printed information and wherein the printed information comprises advertising; wherein the code is associated with a gift card account after the plurality of non-activated gift cards is manufactured and during activation to create at least one activated gift card; wherein the code is assignable to the gift card subsequent to manufacturing to permit variable imprinting of custom codes.

6. The gift card form of claim 5, wherein the form comprises either a single ply of material or multiple plies of one or more materials connected together in layers.

7. The gift card form of claim 5, wherein the form is printable and imprintable.

8. The gift card form of claim 5, wherein the plurality of separable pieces are removably connected to one another as components of the unitary single-sheet form at cuttable lines of separation, tearable lines of separation, perforations, or a combination of any of the foregoing.

9. The gift card form of claim 5, wherein each of the plurality of non-activated gift cards is specific to a different retailer, selling goods or services for which one of the plurality of non-activated gift cards is redeemable.

10. The gift card form of claim 5, wherein each of the plurality of non-activated gift cards is specific to a different manufacturer, providing goods or services for which one of the plurality of non-activated gift cards is redeemable.

11. The gift card form of claim 5, wherein each of the plurality of non-activated gift cards is specific to a product or service that is different from the product or service related to any other gift card in the form.

12. The gift card form of claim 5, wherein at least two of the plurality of non-activated gift cards are specific to a single retailer, selling goods or services for which one of the plurality of non-activated gift cards is redeemable.

13. The gift card form of claim 5, wherein at least two of the plurality of non-activated gift cards are specific to a single manufacturer, providing goods or services for which one of the plurality of non-activated gift cards is redeemable.

14. The gift card form of claim 5, wherein at least two of the plurality of non-activated gift cards are specific to a single product or service that is different from products or services related to any other non-activated gift cards in the form.

15. The gift card form of claim 5, wherein the form comprises two connected plies, wherein the two connected plies comprise a first ply forming a front side of the form and a second ply forming a rear side of the form, wherein the gift envelope of the form comprises a perforation and a slit that are present on the second ply and together create a detachable strip that covers a glue area of a lid of the gift envelope, wherein the detachable strip is removed by tearing the perforation when the gift envelope is detached from the form, and wherein the glue area is uncovered once the detachable strip is removed so that the glue area is capable of being used to seal the gift envelope.

16. The gift card form of claim 5, wherein the form comprises a plurality of unitary single sheets of material, wherein each sheet of material comprises a plurality of separable pieces, wherein at least a first sheet of the plurality of sheets of material comprises a plurality of separable non-activated gift cards, wherein at least a second sheet of the plurality of sheets of material comprises a plurality of separable gift envelopes, and wherein at least a third sheet of the plurality of sheets of material comprises a plurality of separable correspondence pieces.

17. A gift card publication comprising, a plurality of unitary single-sheet forms, each form comprising a plurality of separable pieces, wherein the plurality of separable pieces comprises: a plurality of non-activated gift cards to be activated using a code that is customizable, a gift envelope, and an optional correspondence piece; wherein one or more pieces of the form comprises printed information wherein the printed information comprises advertising; and wherein the plurality of forms are attached together at a binding so as to form a publication; wherein the code is associated with a gift card account after the plurality of unitary single-sheet forms is manufactured to create at least one activated gift card; wherein the code is assignable to the gift card subsequent to manufacturing to permit variable imprinting of customer codes.

18. The gift card publication of claim 17, wherein the binding is a sewn binding, a saddle-stitched binding, or a perfect binding.

19. The gift card publication of claim 17, wherein the plurality of forms are folded to form a center spine and wherein the binding by which the plurality of forms are bound together is located at the center spine.

20. The gift card publication of claim 17, wherein the publication comprises a plurality of leafs formed by stacking the plurality of forms in a desired order to form a stack and folding the plurality of forms at a center line of the stack, wherein the binding is installed on the publication at the folded center line of the stack.

21. The gift card publication of claim 17, wherein the publication is deliverable by mail, courier service, retail distribution attached to other articles being sold by a retailer, retail distribution inserted into other articles being sold by a retailer, or retail distribution enclosed with other articles being sold by a retailer.

22. The gift card publication of claim 17, wherein the publication comprises editorial content, wherein the editorial content comprises, at least in part, information printed or imprinted onto the plurality of non-activated gift cards, the gift envelopes, and the optional correspondence pieces.

23. The gift card publication of claim 17, wherein the publication comprises one or more sheets of material in addition to the plurality of forms.

24. The gift card publication of claim 17, wherein the one or more sheets of material comprise one or more item selected from the group consisting of: a cover sheet, an instruction sheet, an advertisement sheet, an informational sheet, and a multi-purpose sheet that serves at least two of the following purposes: cover sheet, instruction sheet, advertisement sheet, or informational sheet.

25. A method of distributing gift cards to be activated using an activation system and advertising, the activation system being manipulable via a computer connected to the Internet, the method being at least partially performable using the activation system, the method comprising the steps of:
   (a) creating a unitary single-sheet form comprising a plurality of separable pieces, wherein the plurality of separable pieces comprises: a plurality of non-activated gift cards, a gift envelope, and an optional correspondence piece; wherein one or more pieces of the form comprises printed information and wherein the printed information comprises advertising;
   (b) creating a publication package;
   (c) delivering the publication package to a gift giver;
   (d) using the activation system, activating at least one of the plurality of non-activated gift cards after the publication package is created using a code that customizable by the gift giver so as to create at least one activated gift card, the at least one activated gift card being associated with an account when the gift card is activated;
   (e) inserting and sealing the at least one activated gift card, and optionally the optional correspondence piece, into the gift envelope to create a gift card package;
   (f) delivering the gift card package to a gift recipient selected by the gift giver; and
   (g) providing a redemption system operable by the gift recipient using the computer over the Internet whereby the gift recipient can redeem the at least one activated gift card enclosed in the gift card package;
   wherein the code is assignable to the gift card subsequent to manufacturing to permit variable imprinting of custom codes.

26. The method of claim 25, wherein step (b) of the method further comprises inserting and sealing one or more of the forms into a package envelope to create the publication package.

27. The method of claim 25, wherein step (b) of the method further comprises binding one or more of the forms in a magazine, newspaper, or other periodical.

28. The method of claim 25, wherein step (b) of the method further comprises binding one or more of the forms together to create a magazine wherein the plurality of separable pieces comprise editorial content.

29. The method of claim 25, wherein step (b) of the method further comprises inserting one or more of the forms into a magazine, newspaper, or other periodical.

30. The method of claim 25, wherein step (b) of the method further comprises inserting one or more of the forms into a billing envelope containing an invoice being delivered to a customer, wherein the customer is the gift giver.

31. The method of claim 25, wherein the activation system and the redemption system are accessible via a computer connected to the Internet so that activation of the at least one activated gift card and redemption of the at least one activated gift card for a redemption item are performable online via the online gift card mall.

* * * * *